United States Patent
Carey et al.

(10) Patent No.: US 11,296,426 B2
(45) Date of Patent: *Apr. 5, 2022

(54) CROSS-POLARIZED TIME DIVISION DUPLEXED ANTENNA

(71) Applicant: Anokiwave, Inc., San Diego, CA (US)

(72) Inventors: Timothy Carey, San Diego, CA (US); Nitin Jain, San Diego, CA (US); Jason Durbin, San Diego, CA (US); David W. Corman, Gilbert, AZ (US); Vipul Jain, Irvine, CA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,887

(22) Filed: Apr. 9, 2021

(65) Prior Publication Data

US 2021/0296784 A1    Sep. 23, 2021

Related U.S. Application Data

(63) Continuation of application No. 16/413,355, filed on May 15, 2019, now Pat. No. 10,998,640.
(Continued)

(51) Int. Cl.
*H01Q 21/06* (2006.01)
*H01Q 21/00* (2006.01)
(Continued)

(52) U.S. Cl.
CPC .......... *H01Q 21/061* (2013.01); *H01Q 1/241* (2013.01); *H01Q 3/34* (2013.01); *H01Q 21/0087* (2013.01); *H04L 5/1469* (2013.01)

(58) Field of Classification Search
CPC ............ H01Q 1/36; H01Q 1/38; H01Q 1/241; H01Q 1/2283; H01Q 3/36; H01Q 3/2658; H01Q 21/065; H01Q 21/22; H01Q 21/205
See application file for complete search history.

(56) References Cited

U.S. PATENT DOCUMENTS

| 2,982,959 A | 5/1961 | Hanneken |
| 3,483,563 A | 12/1969 | Schroeder |
(Continued)

FOREIGN PATENT DOCUMENTS

| WO | 1995025409 A1 | 9/1995 |
| WO | 2017078851 A2 | 5/2017 |
(Continued)

OTHER PUBLICATIONS

Bailey, "General Layout Guidelines for RF and Mixed-Signal PCBs," Maxim Integrated, Tutorial 5100, 10 pages, Sep. 14, 2011.
(Continued)

*Primary Examiner* — Tung X Le
(74) *Attorney, Agent, or Firm* — Nutter McClennen & Fish LLP

(57) ABSTRACT

A laminar phased array has a first sub-array configured to operate in one of a receive mode with a first polarity and a transmit mode with a second polarity, and a second sub-array configured to operate in one of a receive mode with the second polarity and a transmit mode with the first polarity. The first polarity is physically orthogonal to the second polarity. The array also has a controller configured to control the first and second sub-arrays so that they operate together in either 1) a receive mode or 2) a transit mode. Accordingly, both sub-arrays are configured to operate at the same time to receive signals in the first and second polarities when in the receive mode. In a corresponding manner, both sub-arrays are configured to operate at the same time to transmit signals in the first and second polarities when in the transmit mode.

14 Claims, 15 Drawing Sheets

Related U.S. Application Data

(60) Provisional application No. 62/671,763, filed on May 15, 2018.

(51) Int. Cl.
*H04L 5/14* (2006.01)
*H01Q 1/24* (2006.01)
*H01Q 3/34* (2006.01)

(56) References Cited

U.S. PATENT DOCUMENTS

| | | | |
|---|---|---|---|
| 5,027,125 A | 6/1991 | Tang | |
| 5,068,668 A | 11/1991 | Tsuda et al. | |
| 5,381,157 A | 1/1995 | Shiga | |
| 5,448,250 A | 9/1995 | Day | |
| 5,554,995 A | 9/1996 | Jun | |
| 5,568,158 A | 10/1996 | Gould | |
| 5,648,955 A | 7/1997 | Jensen et al. | |
| 5,724,666 A | 3/1998 | Dent | |
| 5,949,376 A | 9/1999 | McDonald et al. | |
| 5,959,980 A | 9/1999 | Scott | |
| 5,982,329 A | 11/1999 | Pittman et al. | |
| 6,002,370 A | 12/1999 | Mckinnon et al. | |
| 6,067,053 A | 5/2000 | Runyon et al. | |
| 6,166,705 A | 12/2000 | Mast et al. | |
| 6,252,559 B1 | 6/2001 | Donn | |
| 6,411,258 B1 | 6/2002 | Ho | |
| 6,411,824 B1 | 6/2002 | Eidson | |
| 6,519,478 B1 | 2/2003 | Scherzer et al. | |
| 6,611,231 B2 | 8/2003 | Crilly, Jr. et al. | |
| 6,686,885 B1 | 2/2004 | Barkdoll et al. | |
| 6,760,603 B1 | 7/2004 | Scherzer et al. | |
| 6,995,712 B2 | 2/2006 | Boyanov | |
| 7,027,454 B2 | 4/2006 | Dent | |
| 7,062,245 B2 | 6/2006 | Miyano et al. | |
| 7,087,993 B2 | 8/2006 | Lee | |
| 7,129,568 B2 | 10/2006 | Lee et al. | |
| 7,327,317 B2 | 2/2008 | Heiniger | |
| 7,372,911 B1 | 5/2008 | Lindskog et al. | |
| 7,538,740 B2 * | 5/2009 | Korisch | H01Q 1/246 343/844 |
| 7,656,342 B2 | 2/2010 | Stolarczyk et al. | |
| 7,894,768 B2 | 2/2011 | Ding et al. | |
| 8,031,117 B2 | 10/2011 | Goldberg | |
| 8,098,198 B2 | 1/2012 | Thiesen et al. | |
| 8,120,537 B2 | 2/2012 | del Rio et al. | |
| 8,160,530 B2 | 4/2012 | Corman et al. | |
| 8,352,040 B2 | 1/2013 | Von Arx et al. | |
| 8,385,305 B1 | 2/2013 | Negus et al. | |
| 8,558,398 B1 | 10/2013 | Seetharam | |
| 8,558,735 B2 | 10/2013 | Bachmann et al. | |
| 8,587,492 B2 | 11/2013 | Runyon | |
| 8,633,856 B2 | 1/2014 | Rao | |
| 8,649,418 B1 | 2/2014 | Negus et al. | |
| 8,665,846 B2 | 3/2014 | O'Keefe | |
| 8,737,190 B2 | 5/2014 | Yong et al. | |
| 8,792,820 B2 | 7/2014 | Grotz | |
| 8,817,672 B2 | 8/2014 | Corman et al. | |
| 8,838,036 B2 | 9/2014 | Yoon et al. | |
| 8,866,283 B2 | 10/2014 | Chen et al. | |
| 8,872,719 B2 | 10/2014 | Warnick | |
| 8,989,762 B1 | 3/2015 | Negus et al. | |
| 9,077,413 B2 | 7/2015 | Hawryluck et al. | |
| 9,088,388 B2 | 7/2015 | Alamouti et al. | |
| 9,094,102 B2 | 7/2015 | Corman et al. | |
| 9,118,361 B2 | 8/2015 | Barker et al. | |
| 9,203,161 B2 | 12/2015 | Orihashi et al. | |
| 9,276,321 B2 | 3/2016 | Smith et al. | |
| 9,285,461 B2 | 3/2016 | Swirhun et al. | |
| 9,293,835 B2 | 3/2016 | Clymer et al. | |
| 9,306,291 B2 | 4/2016 | Lu et al. | |
| 9,368,880 B2 | 6/2016 | Solondz | |
| 9,520,637 B2 | 12/2016 | Monte et al. | |
| 9,520,655 B2 | 12/2016 | Cerreno | |
| 9,680,234 B2 | 6/2017 | Love et al. | |
| 9,705,611 B1 | 7/2017 | West | |
| 9,712,216 B2 | 7/2017 | Lea et al. | |
| 9,753,118 B2 | 9/2017 | Sanderovich et al. | |
| 9,768,513 B2 | 9/2017 | Lee et al. | |
| 9,806,422 B2 | 10/2017 | Garcia et al. | |
| 9,853,358 B2 | 12/2017 | Wu et al. | |
| 9,929,886 B2 | 3/2018 | Amadjikpe et al. | |
| 9,935,663 B1 | 4/2018 | Rofougaran et al. | |
| 10,020,555 B2 | 7/2018 | Sarkar et al. | |
| 10,116,066 B2 | 10/2018 | Schaepperle | |
| 10,135,501 B2 | 11/2018 | Lea et al. | |
| 10,181,888 B2 | 1/2019 | Wei et al. | |
| 10,218,426 B1 | 2/2019 | Sano et al. | |
| 10,298,275 B2 | 5/2019 | Gharavi et al. | |
| 10,439,675 B2 | 10/2019 | Johnson et al. | |
| 10,468,781 B1 | 11/2019 | Paulsen et al. | |
| 10,686,258 B2 | 6/2020 | Zihir et al. | |
| 10,742,288 B2 | 8/2020 | McMorrow et al. | |
| 10,854,995 B2 | 12/2020 | Rofougaran et al. | |
| 10,998,640 B2 | 5/2021 | Carey et al. | |
| 11,011,853 B2 | 5/2021 | Corman et al. | |
| 2002/0102948 A1 | 8/2002 | Stanwood et al. | |
| 2004/0157645 A1 | 8/2004 | Smith et al. | |
| 2005/0017352 A1 | 1/2005 | Lee | |
| 2005/0063353 A1 | 3/2005 | Anderson et al. | |
| 2005/0082645 A1 | 4/2005 | Lee et al. | |
| 2005/0098860 A1 | 5/2005 | Lai et al. | |
| 2005/0243527 A1 | 11/2005 | Jandzio et al. | |
| 2006/0006505 A1 | 1/2006 | Chiang et al. | |
| 2006/0014491 A1 | 1/2006 | Cleveland | |
| 2007/0152882 A1 | 7/2007 | Hash et al. | |
| 2007/0274249 A1 | 11/2007 | Hulbert et al. | |
| 2008/0119190 A1 | 5/2008 | Karabinis | |
| 2008/0150800 A1 | 6/2008 | Tsuji | |
| 2008/0218424 A1 | 9/2008 | Blanton | |
| 2008/0246680 A1 | 10/2008 | Rawnick et al. | |
| 2009/0256752 A1 | 10/2009 | Akkermans et al. | |
| 2010/0099370 A1 | 4/2010 | Nichols et al. | |
| 2010/0194663 A1 | 8/2010 | Rothwell et al. | |
| 2010/0260076 A1 | 10/2010 | Corman et al. | |
| 2010/0261440 A1 | 10/2010 | Corman et al. | |
| 2011/0001678 A1 | 1/2011 | Hsu et al. | |
| 2011/0090129 A1 | 4/2011 | Weily et al. | |
| 2011/0175789 A1 | 7/2011 | Lee et al. | |
| 2011/0198742 A1 | 8/2011 | Danno et al. | |
| 2011/0267998 A1 | 11/2011 | Meharry et al. | |
| 2011/0316745 A1 | 12/2011 | Yin | |
| 2012/0127034 A1 | 5/2012 | DiFonzo | |
| 2012/0313219 A1 | 12/2012 | Chen et al. | |
| 2013/0050055 A1 | 2/2013 | Paradiso et al. | |
| 2013/0057449 A1 | 3/2013 | Orihashi et al. | |
| 2013/0072125 A1 | 3/2013 | Yoon et al. | |
| 2013/0088381 A1 | 4/2013 | Puzella et al. | |
| 2013/0088391 A1 | 4/2013 | Corman et al. | |
| 2013/0187830 A1 | 7/2013 | Warnick et al. | |
| 2014/0111373 A1 | 4/2014 | Puzella et al. | |
| 2014/0210668 A1 * | 7/2014 | Wang | H04B 7/0665 342/372 |
| 2014/0255040 A1 | 9/2014 | Fujita et al. | |
| 2014/0266897 A1 | 9/2014 | Jakoby et al. | |
| 2014/0266902 A1 | 9/2014 | Kamgaing et al. | |
| 2014/0348035 A1 | 11/2014 | Corman et al. | |
| 2015/0016561 A1 | 1/2015 | Negus et al. | |
| 2015/0116177 A1 | 4/2015 | Powell et al. | |
| 2015/0171523 A1 * | 6/2015 | Kamgaing | H01Q 21/0087 343/893 |
| 2015/0234035 A1 | 8/2015 | Lohoefener et al. | |
| 2015/0241552 A1 | 8/2015 | Mohamadi | |
| 2015/0263424 A1 | 9/2015 | Sanford et al. | |
| 2015/0362583 A1 | 12/2015 | Ainspan et al. | |
| 2016/0020844 A1 | 1/2016 | Hart et al. | |
| 2016/0056544 A1 | 2/2016 | Garcia et al. | |
| 2016/0141757 A1 | 5/2016 | Lai et al. | |
| 2016/0218429 A1 | 7/2016 | Klemes | |
| 2016/0226142 A1 | 8/2016 | Leroux | |
| 2016/0248157 A1 | 8/2016 | Rao et al. | |
| 2016/0277078 A1 | 9/2016 | Trotta | |
| 2017/0062910 A1 | 3/2017 | Iida | |
| 2017/0062926 A1 | 3/2017 | Bonebright et al. | |

(56) References Cited

U.S. PATENT DOCUMENTS

| | | |
|---|---|---|
| 2017/0085006 A1 | 3/2017 | Corman et al. |
| 2017/0194703 A1 | 7/2017 | Watson |
| 2017/0229785 A1 | 8/2017 | Fu et al. |
| 2017/0237180 A1 | 8/2017 | Corman et al. |
| 2017/0302003 A1 | 10/2017 | Elsallal et al. |
| 2017/0353338 A1 | 12/2017 | Amadjikpe et al. |
| 2018/0019804 A1 | 1/2018 | Buer et al. |
| 2018/0054005 A1 | 2/2018 | Jain et al. |
| 2018/0069309 A1 | 3/2018 | Friedman et al. |
| 2018/0090814 A1 | 3/2018 | Yoon et al. |
| 2018/0109404 A1* | 4/2018 | Yoon et al. |
| 2018/0115087 A1* | 4/2018 | Besoli ................. H01Q 21/065 |
| 2018/0175476 A1 | 6/2018 | Teshiba et al. |
| 2018/0183504 A1 | 6/2018 | McMorrow et al. |
| 2018/0219283 A1 | 8/2018 | Wilkins et al. |
| 2018/0234119 A1 | 8/2018 | Gharavi et al. |
| 2018/0294826 A1 | 10/2018 | Fouche et al. |
| 2018/0337739 A1 | 11/2018 | Petersson et al. |
| 2019/0044251 A1* | 2/2019 | McMorrow .......... H01Q 21/065 |
| 2019/0089048 A1* | 3/2019 | Kanar ................... H01Q 19/30 |
| 2019/0173538 A1 | 6/2019 | Wu et al. |
| 2020/0036103 A1 | 1/2020 | Ariumi |
| 2020/0145265 A1 | 5/2020 | Fleizach |

FOREIGN PATENT DOCUMENTS

| | | |
|---|---|---|
| WO | 2017185979 A1 | 11/2017 |
| WO | 2018028310 A1 | 2/2018 |
| WO | 2018/119153 A2 | 6/2018 |

OTHER PUBLICATIONS

Maxim,—"5GHz, 4-Channel MIMO Transmitter", MAX2850, Maxim Integrated Products, Inc., 33 pages, 2010.

European Patent Office—Extended European Search Report,—EP Application No. 16862647.1, dated Aug. 6, 2019, 7 pages.

International Search Report and Written Opinion for International Application No. PCT/US2018/067449, dated Apr. 30, 2019 (16 pages).

Ismail—Introduction to RF CMOS IC Design for Wireless Applications, Analog VLSI Lab, The Ohio State University, 117 pages, Dec. 11, 2001.

International Searching Authority—International Search Report—International Application No. PCT/US2016/052215, dated May 29, 2017, together with the Written Opinion of the International Searching Authority, 16 pages.

Jain—Layout Review Techniques for Low RF Designs, Application Note AN098, Texas Instruments, 14 Pages, 2012.

Silicon Labs—Layout Design Guide for Si4455/435x RF Ics, AN685, Silicon Laboratories, 22 pages, 2014.

* cited by examiner

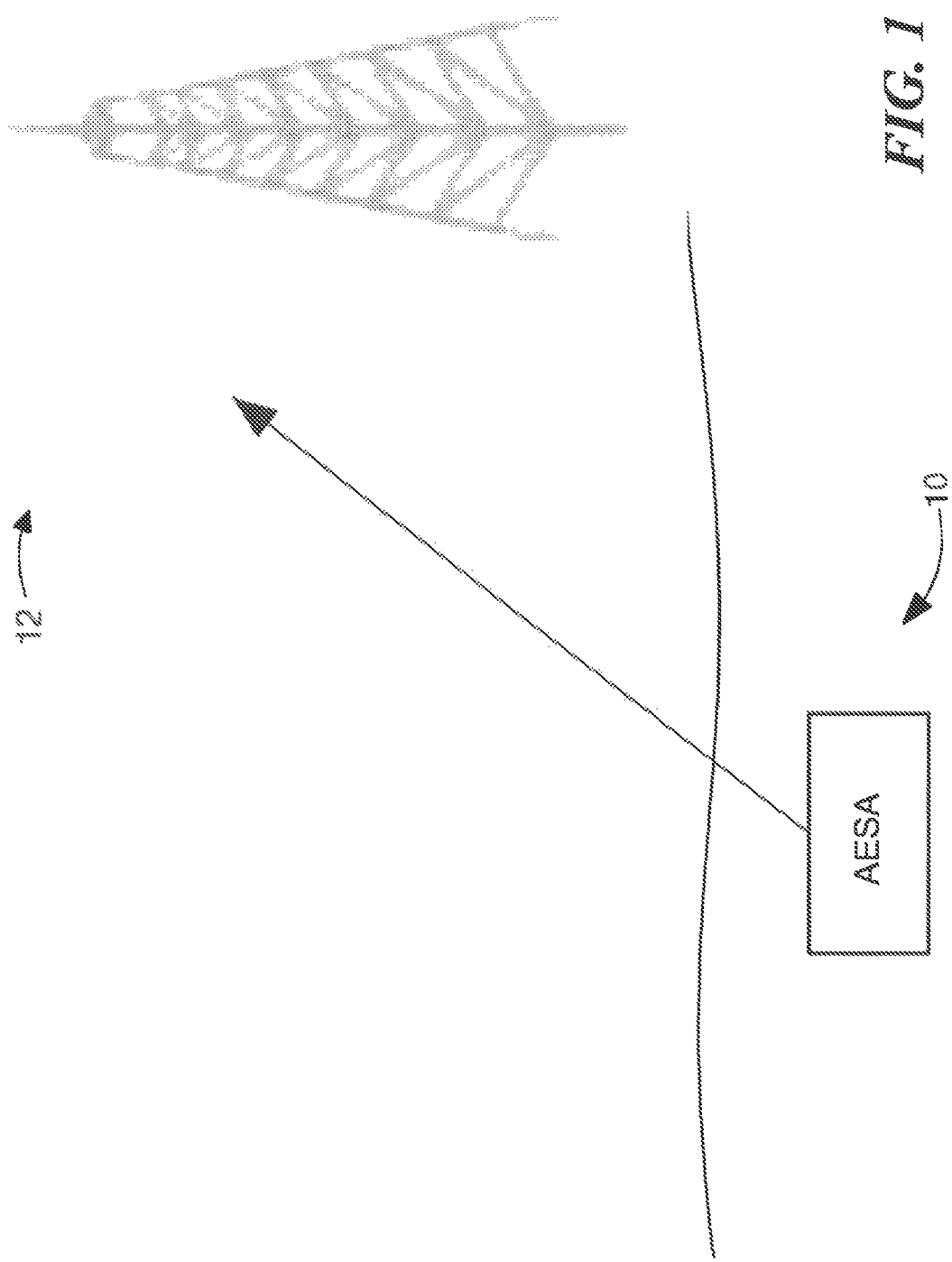

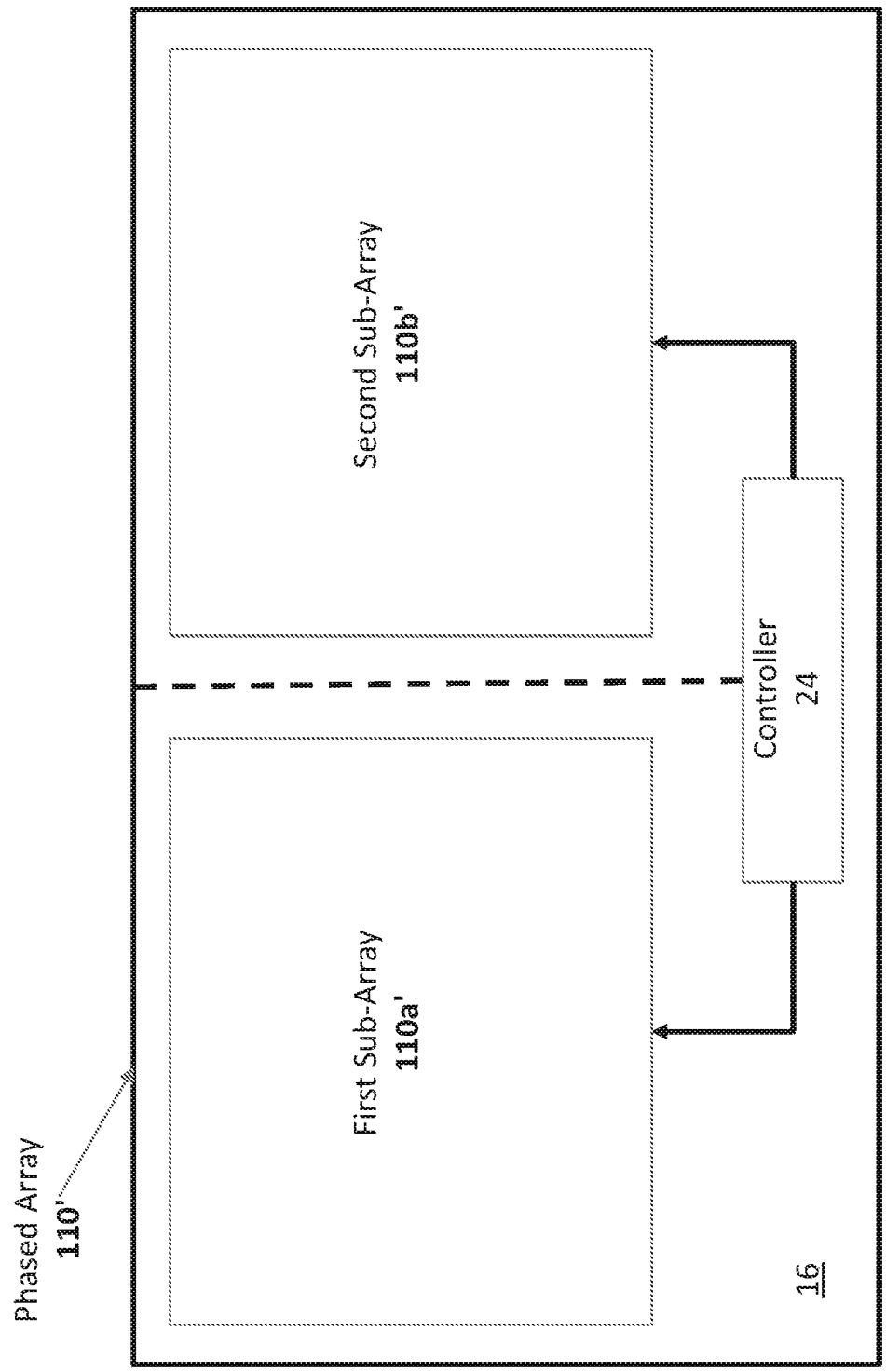

CROSS-POLARIZED TIME DIVISION DUPLEXED ANTENNA

RELATED APPLICATIONS

This patent application is a continuation of U.S. patent application Ser. No. 16/413,355 filed May 15, 2019, which claims priority from U.S. Provisional Patent Application No. 62/671,763 May 15, 2018, entitled "Cross-Polarized Time Division Duplexed Antenna," each of which is incorporated herein by reference in their entirety.

This patent application is also related to U.S. patent application Ser. No. 15/267,704, filed on Sep. 16, 2016, entitled, "LAMINAR PHASED ARRAY WITH POLARIZATION-ISOLATED TRANSMIT/RECEIVE INTERFACES," and naming David Corman, Vipul Jain, Timothy Carey, and Nitin Jain as inventors, the disclosure of which is incorporated herein, in its entirety, by reference.

FIELD OF THE INVENTION

The invention generally relates to phased array systems and, more particularly, the invention relates to laminar phased arrays/patch arrays.

BACKGROUND OF THE INVENTION

Antennas that emit electronically steered beams are known in the art as "phased array antennas." Such antennas are used worldwide in a wide variety of commercial and radar applications. They typically are produced from many small radiating elements that are individually phase and amplitude controlled to form a beam in the far field of the antenna.

Among other things, phased array antennas are popular due to their ability to rapidly steer beams without requiring moving parts. One problem, however, is their cost. They can cost on the order of $1000 per element. Thus, for a 1000 element array, the cost can reach or exceed $1,000,000. Known designs for use with the 5G standard, for example, require four independently steered antenna arrays, which can further add to the cost.

SUMMARY OF VARIOUS EMBODIMENTS

In accordance with one embodiment of the invention, a laminar phased array has a first sub-array configured to operate in one of a receive mode with a first polarity and a transmit mode with a second polarity, and a second sub-array configured to operate in one of a receive mode with the second polarity and a transmit mode with the first polarity. The first polarity is physically orthogonal to the second polarity. The array also has a controller configured to control the first and second sub-arrays so that they operate together in either 1) a receive mode or 2) a transmit mode. Accordingly, both sub-arrays are configured to operate at the same time to receive signals in the first and second polarities when in the receive mode. In a corresponding manner, both sub-arrays are configured to operate at the same time to transmit signals in the first and second polarities when in the transmit mode.

The first sub-array preferably has a laminar substrate, a plurality of elements configured to form a patch based phased array, and a plurality of integrated circuits configured to control receipt and/or transmission of signals by the plurality of elements. Each element preferably is physically coupled with a first integrated circuit interface at a first location on the element, and a second integrated circuit interface at a second location on the element. As such, signals interfacing with the first integrated circuit interface are in the first polarization, while the signals interfacing with the second integrated circuit interface are in the second polarization. The first and second locations are spaced apart.

The plurality of integrated circuits each may be configured to receive-only or transmit-only—not both. Alternatively, the plurality of integrated circuits each may be configured to both receive and transmit. Among other things, the plurality of integrated circuits may be configured to operate the phased array to communicate with mobile devices using 5G protocols.

The first polarity may be a vertical polarity while the second polarity may be a horizontal polarity. Conversely, the first polarity may be the horizontal polarity while the second polarity may be the vertical polarity. Illustratively, the first and second sub-arrays are transmit/receive switch-free. The sub-arrays may have separate substrates. Thus, the first sub-array may include a first laminar substrate, and the second sub-array may include a second (i.e., different) laminar substrate. Alternatively, the first sub-array and second sub-array may share a single laminar substrate.

In accordance with another embodiment of the invention, a beam forming integrated circuit includes multiple integrated circuit interfaces. Each of the integrated circuit interfaces is configured to communicate signals in one of a first polarity and a second polarity to or from a respective location at a corresponding antenna element. The beam forming integrated circuit is disposed within one of a first sub-array and a second sub-array included in a phased array antenna. The first sub-array is configured to operate in one of a receive mode with the first polarity and a transmit mode with the second polarity, the first polarity being physically orthogonal to the second polarity. The second sub-array is configured to operate in one of a receive mode with the second polarity and a transmit mode with the first polarity.

The first sub-array and the second sub-array can be configured to operate together in the receive mode such that the first sub-array and the second sub-array receive incoming signals in the first polarity and incoming signals in the second polarity at the same time. The first sub-array and the second sub-array can also be configured to operate together in the transmit mode such that the first sub-array and the second sub-array transmit outgoing signals in the first polarity and output signals in the second polarity at the same time.

In some embodiments, the beam forming integrated circuit can be a receive-only integrated circuit and the integrated circuit interfaces are configured to receive incoming signals in one of a horizontal polarity and a vertical polarity. The beam forming integrated circuit can be a transmit-only integrated circuit and the integrated circuit interfaces are configured to transmit outgoing signals in one of a horizontal polarity and a vertical polarity. The beam forming integrated circuit can be a dual transmit/receive integrated circuit such that one or more of the integrated circuit interfaces are configured to receive incoming signals in a horizontal polarity and one or more of the integrated interfaces are configured to transmit outgoing signals in a vertical polarity. The beam forming integrated circuit can be a dual transmit/receive integrated circuit such that one or more of the integrated circuit interfaces are configured to receive incoming signals in a vertical polarity and one or more of the integrated interfaces are configured to transmit outgoing signals in a horizontal polarity.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1 schematically shows an active electronically steered antenna system ("AESA system") configured in accordance with illustrative embodiments of the invention and communicating with a base station.

FIGS. 7A, 7B, and 7C schematically show one exemplary embodiment of a phased array antenna including cross-polarized sub-arrays having multiple dual transmit/receive integrated circuits to control antenna elements in accordance with illustrative embodiments of the invention.

DESCRIPTION OF ILLUSTRATIVE EMBODIMENTS

In illustrative embodiments, a laminar phased array antenna (sometimes referred to herein as a "phased array") is configured to operate with both vertical and horizontal polarity signals at the same time with a small footprint. To that end, the array has a first sub-array with receive and transmit radiating antenna elements (or "elements") oriented to operate at a first polarity, and a second sub-array with receive and transmit elements oriented to operate at a second polarity. For example, the first sub-array may have receive and transmit elements that use horizontally and vertically polarized signals respectively, while the second sub-array may have receive and transmit elements that use vertically and horizontally polarized signals respectively. Details of illustrative embodiments are discussed below.

FIG. 1 schematically shows an active electronically steered antenna system ("AESA system 10") configured in accordance with illustrative embodiments of the invention and communicating with a base station 12, such as a 5G base station, for example. A phased array (discussed below and identified by reference number "10A") implements the primary functionality of the AESA system 10. Specifically, as known by those skilled in the art, the phased array 10A forms one or more of a plurality of electronically steerable beams that can be used for a wide variety of applications. As a 5G communication system, for example, the AESA system 10 preferably is configured operate at one or more 5G frequencies. Among others, those frequencies may include the 24 GHz, 28 GHz, or 39 GHz bands. Other embodiments may use other bands, such as the Ka-band, Ku-band, and/or X-band, when communicating with a satellite system.

The AESA system 10 may be part of a cellular network operating under a known cellular protocol, such as the 3G, 4G, or 5G protocols. Accordingly, in addition to communicating with base stations, the system may communicate with earth-bound devices, such as smartphones or other mobile devices, using any of the 3G, 4G, or 5G protocols. As another example, the AESA system 10 may transmit and/or receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for satellite communications (e.g., using 4G or 5G protocols). Accordingly, discussion of communication with any of the above noted antennas and/or communication systems is not intended to limit all embodiments of the invention.

Figure 2A:
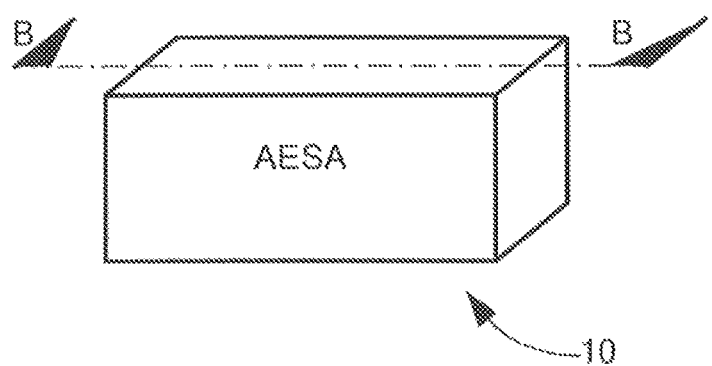
FIGS. 2A and 2B schematically show generalized diagrams of an AESA system that may be configured in accordance with illustrative embodiments of the invention.
Figure 2B:
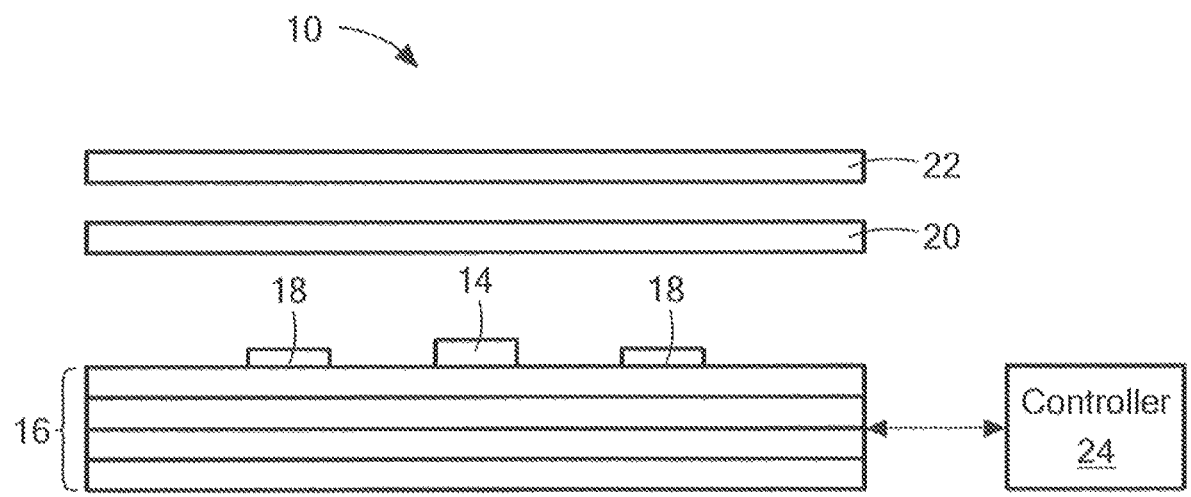

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 (controlling elements 18, discussed below) mounted onto a substrate 16 between two transmit and/or receive elements 18, i.e., on the same side of a supporting substrate 16 and juxtaposed with the two elements 18. In alternative embodiments, however, the integrated circuit 14 can be mounted on the other side/surface of the substrate 16. When used with a satellite system, the phased array 10A may also have a polarizer 20 to selectively filter signals to and from the phased array 10A, and a radome 22 to environmentally protect the phased array 10A. A separate antenna controller 24 (FIG. 2B) electrically connects with the phased array 10A to calculate beam steering vectors for the overall phased array 10A, and to provide other control functions.

Figure 3A:
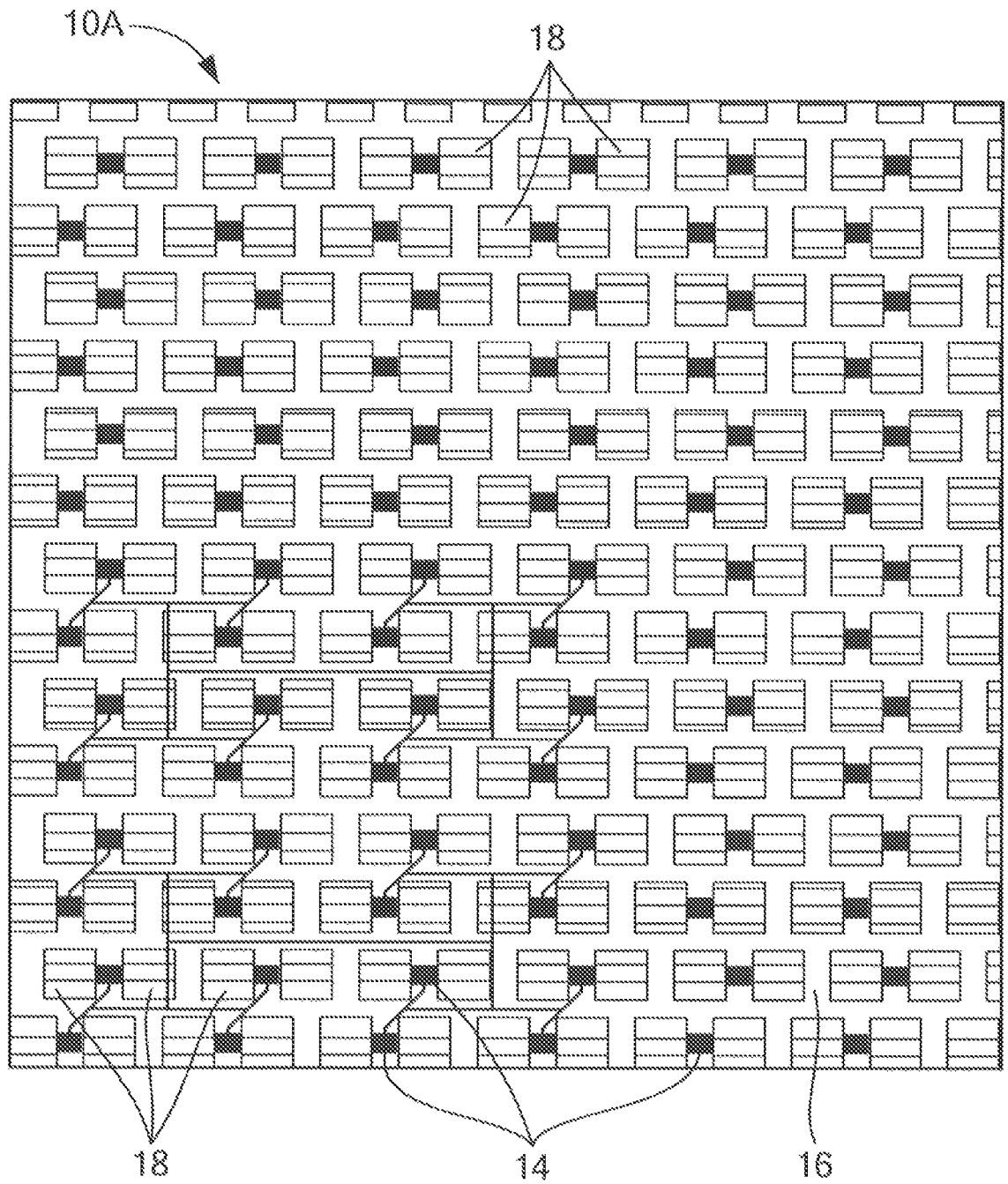
FIG. 3A schematically shows a plan view of a laminar printed circuit board portion of an AESA system configured in accordance with illustrative embodiments of the invention.

FIG. 3A schematically shows a plan view of a primary portion of an AESA system 10 that may be configured in accordance with one illustrative embodiment of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate and also identified by reference number "16") supporting the above noted plurality of elements 18 and integrated circuits 14. The elements 18 preferably are formed as a plurality of square, rectangular, or circular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a square or other rectangular lattice configuration (e.g., see FIGS. 5-8). Like other similar phased arrays, the printed circuit board 16 also may have a ground plane (not shown) that electrically and magnetically cooperates with the elements 18 to facilitate operation.

Figure 3B:
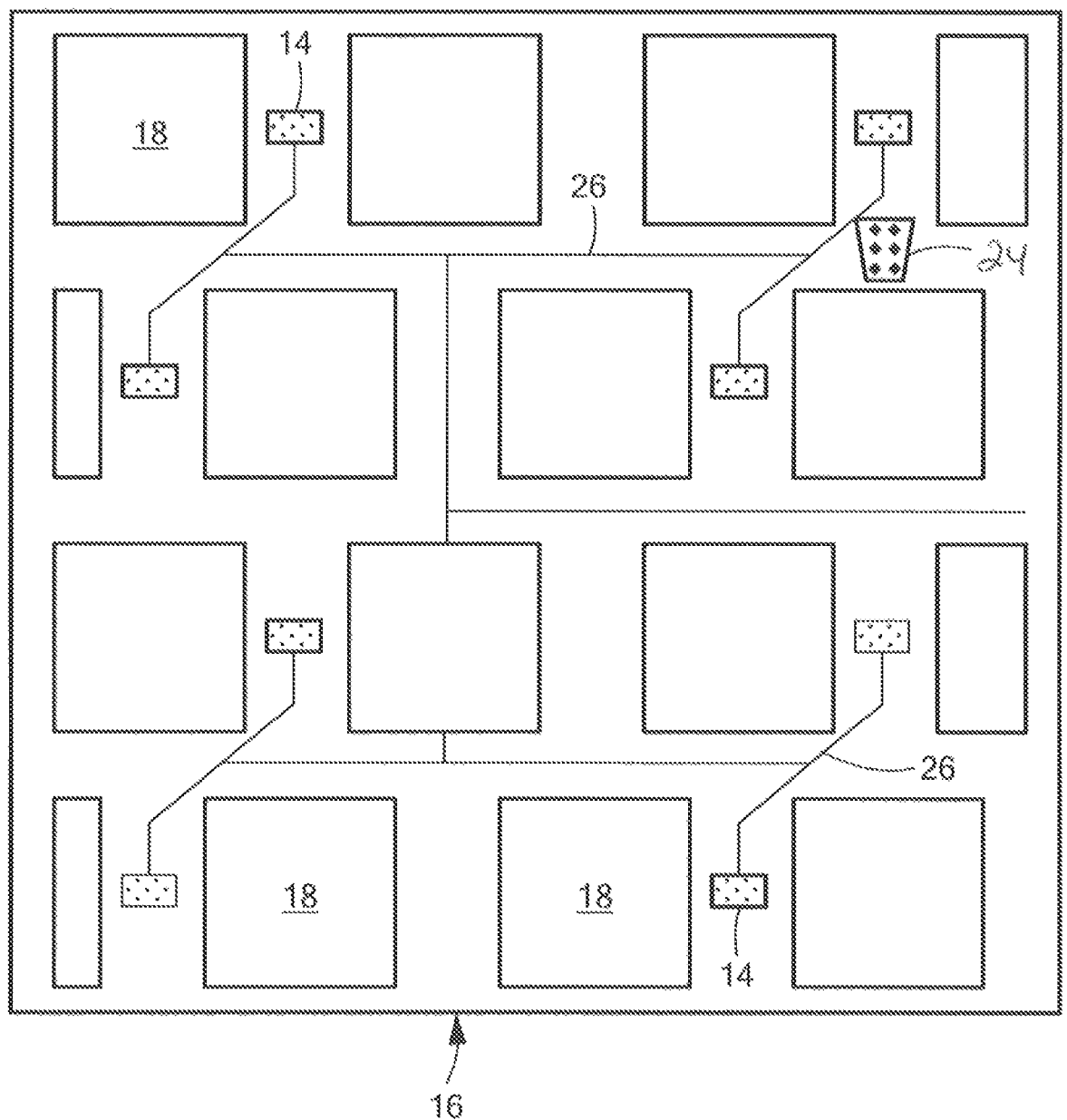
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional Printed Circuit Board (PCB) fabrication processes, such as by depositing or plating one or more successive metal layers on the printed circuit board 16. Accordingly, using such fabrication processes, each radiating element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24 at least in part controls the mode and operation of the phased array 10A, as well as other array functions.

The AESA system 10 has a plurality of the above noted integrated circuits 14 (mentioned above with regard to FIG. 2B) for controlling operation of the elements 18. Those skilled in the art often refer to these integrated circuits 14 as "beam steering integrated circuits" or "beam forming integrated circuits."

Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
 phase shifting,
 amplitude controlling/beam weighting,
 switching between transmit mode and receive mode,
 output amplification to amplify output signals to the elements 18,
 input amplification for received RF signals (e.g., signals received from the satellite 12), and
 power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed in the above noted U.S. patent application Ser. No. 15/267,704, filed on Sep. 16, 2016, entitled, "LAMINAR PHASED ARRAY WITH POLARIZATION-ISOLATED TRANSMIT/RECEIVE INTERFACES".

Each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16.

As noted above, the dual-mode elements 18 may operate in a transmit mode, or a receive mode. To that end, the integrated circuits 14 may generate time division diplex or duplex waveforms so that a single element (sometimes referred to herein as an "aperture") or the phased array 10A, generally, can be used for both transmitting and receiving. In a similar manner, some embodiments may eliminate a commonly included transmit/receive switch in the side arms of the integrated circuit 14. Instead, such embodiments may duplex at an element 18. This process can be performed by isolating an element 18 between transmit and receive by an orthogonal feed connection. The inventors discovered that such a feed connection may eliminate about a 0.8 dB switch loss and improve G/T (i.e., the ratio of the gain or directivity to the noise temperature) by about 1.3 dB for some implementations, enabling (in some instances) a reduction in array size by about 35 percent. Additional details of the orthogonal feed connection are discussed below.

RF interconnect and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package) or Flip-chip chip-scale-package (FC-CSP). While other types of packaging may suffice, WLCSP techniques are preferred to minimize real estate on the substrate 16.

In addition to reducing feed loss, using WLCSP techniques reduces the overall footprint of the integrated circuits 14, enabling them to be mounted on the top face of the printed circuit board 16 with the elements 18—providing more surface area for the elements 18 and its routing lines 26 (sometimes referred to herein as "RF interconnect and/or beamforming lines").

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Figure 4:
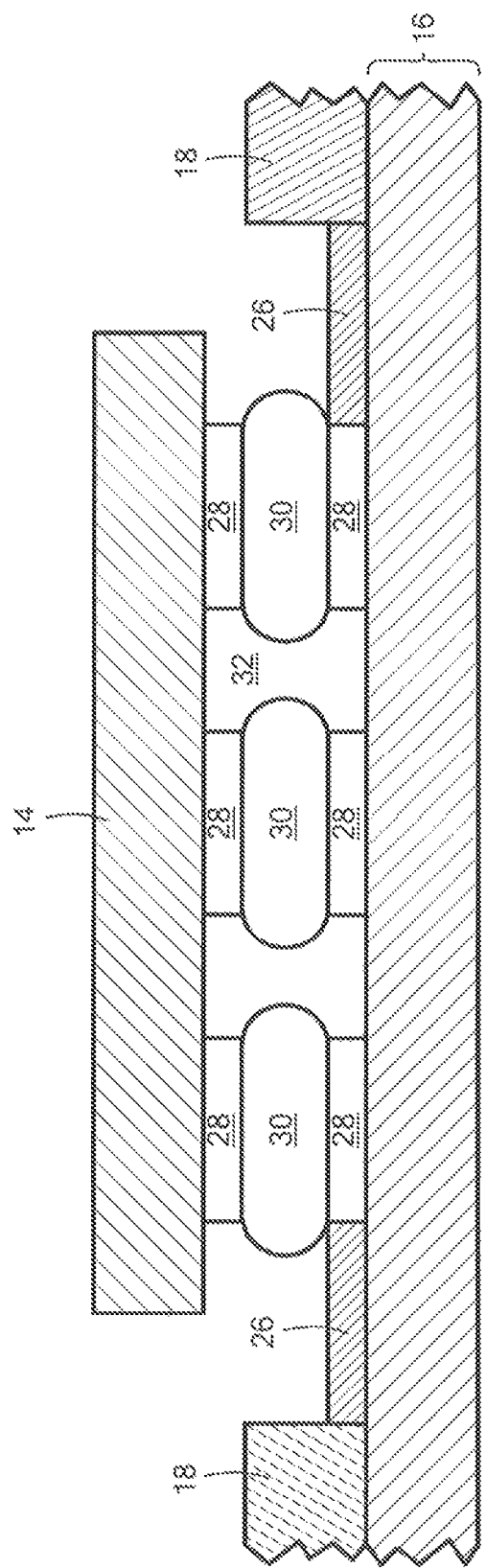
FIG. 4 schematically shows a cross-sectional view of the laminated printed circuit board of FIG. 3A to highlight the mounting of its integrated circuits.

FIG. 4 schematically shows a cross-sectional view of the layout of components on the laminated printed circuit board 16 of FIG. 3A to highlight the flip-chip mounting of its integrated circuits 14. The integrated circuit 14 in this drawing intentionally is enlarged to show details of a flip-chip mounting technique. Unlike techniques that permit input/output ("I/O") only on the edge of the integrated circuit 14, flip-chip mounting permits I/O on interior portions of the integrated circuit 14.

As shown, the integrated circuit 14 has a plurality of pads 28 aligned with a plurality of corresponding pads 28 on the printed circuit board 16. These opposing pads 28 on the integrated circuit 14 and the printed circuit board 16 may be considered to form pairs of pads 28. Solder 30 (e.g., solder balls) electrically connects each the pads in corresponding pairs of pads 28. Interconnect lines, traces, and other electrical interconnects on/in the printed circuit board 16 (e.g., lines 26) thus permit the integrated circuit 14 to communicate with other elements 18 through this electrical interface.

The embodiment shown in FIG. 4 forms a space or void (identified by is reference number "32") between the bottom of the integrated circuit 14 (from the perspective of this drawing) and the top surface of the printed circuit board 16. This space 32 may remain an open void—containing no material. Some embodiments may take advantage of this extra space 32 to add further components, such as additional circuit elements, without requiring more circuit board space. Alternatively, this space 32 may contain fill material (not shown) for further stability and thermal management of the integrated circuit 14.

Other embodiments, however, still may use similar integrated circuits 14, but not use flip-chip mounting techniques. Instead, other mounting techniques may couple the integrated circuits 14 with the substrate 16. Among other things, those techniques may incorporate surface mounting, or wirebond mounting with the integrated circuit 14 rotated 180 degrees from the orientation of FIG. 4. Accordingly, discussion of flip chip mounting techniques is but one of a variety of different techniques that may be used with various embodiments of the invention.

For some communication protocols, such as 5G, when operating in a transmit mode, a phased array may be required to transmit outgoing signals with orthogonal or otherwise different polarities at the same time (e.g., vertical and horizontal polarities). Additionally, when operating in a receive mode, the phased array may be required to receive incoming signals with different polarities at the same time. Accordingly, conventional phased arrays typically include dedicated sub-arrays of antenna elements that are configured to either transmit or receive signals in one of the different polarities. For example, some conventional phased arrays may include at least four dedicated sub-arrays for transmitting outgoing signals in a vertical polarity, transmitting outgoing signals in a horizontal polarity, receiving incoming signals in the vertical polarity, and receiving incoming signals in the horizontal polarity, respectively.

As described in more detail below, various of the illustrated embodiments disclosed herein may include time division duplexed (TDD) phased arrays antenna having cross-polarized sub-arrays of antenna elements to reduce the number of sub-arrays for respectively transmitting or receiving signals with different polarities at the same time. To that end, the phased arrays of various embodiments may include a first sub-array configured to receive incoming signals in a first polarity and transmit outgoing signals in a second polarity and, additionally, a second sub-array configured to receive incoming signals in the second polarity and transmit outgoing signals in the first polarity. Thus, the sub-arrays are cross-polarized in that the receive and transmit polarities of the first sub-array are opposite to the respective receive and transmit polarities of the second sub-array. The first polarity can be physically orthogonal to the second polarity (e.g., vertical and horizontal polarities, or vice versa).

The array can also include a controller configured to control the respective sub-arrays so that they operate together in either 1) a receive mode or 2) a transmit mode. Accordingly, when in the receive mode, the respective sub-arrays can be configured to operate at the same time to receive incoming signals in the first and second polarities. In a corresponding manner, when in the transmit mode, the respective sub-arrays can be configured to operate at the same time to transmit outgoing signals in the first and second polarities. Advantageously, the number of sub-arrays in the phased arrays of such embodiments can be less than (e.g., approximately half) the number of sub-arrays typically used in conventional phased arrays (e.g., two sub-arrays as opposed to four sub-arrays). Thus, the overall footprint (or size) and manufacturing costs associated with such phased arrays can be substantially less than the size and cost associated with conventional phased arrays.

Figure 5:
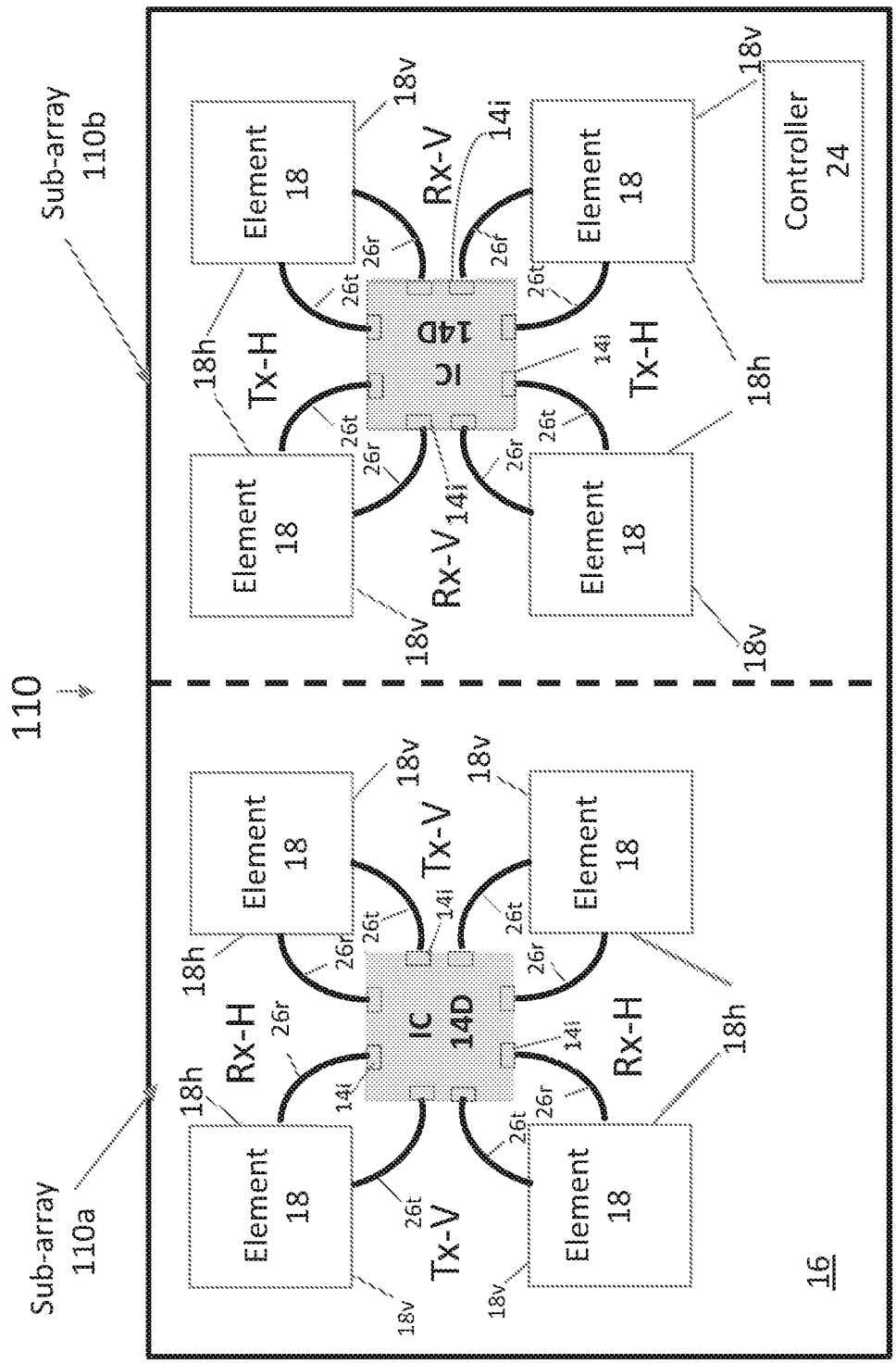
FIG. 5 schematically shows one exemplary embodiment of a phased array antenna of an AESA system including cross-polarized sub-arrays configured in accordance with illustrative embodiments of the invention.

FIG. 5 schematically shows a plan view of one exemplary embodiment of a laminar phased array 110 configured in accordance with illustrative embodiments of the invention. As shown, the phased array 110 includes two sub-arrays 110a and 110b. In this example, the first sub-array 110a is configured to receive horizontally polarized signals and transmit vertically polarized signals. In a complementary manner, the second sub-array 110b is configured to receive vertically polarized signals and transmit horizontally polarized signals.

As indicated above, a controller 24 can be configured to coordinate operation of the two sub-arrays 110a and 110b so that, in the receive mode, the overall array 110 receives both horizontally polarized and vertically polarized signals. For example, in illustrative embodiments, the first sub-array 110a receives horizontally polarized signals, while second sub-array 110b receives vertically polarized signals. When in the receive mode, the sub-arrays 110a and 110b can be prevented from transmitting signals.

In a corresponding manner, when in the transmit mode, the overall phased array 110 transmits both horizontally polarized and vertically polarized signals. For example, in illustrated embodiments, the first sub-array 110a transmits vertically polarized signals, while the second sub-array 110b transmits horizontally polarized signals. When in the transmit mode, the sub-arrays 110a and 110b can be prevented from receiving signals.

Accordingly, this laminar phased array 110 can operate with various protocols, such as the 5G protocol, which requires receipt and transmission of two different polarized signals at the same time. Advantageously, the phased array 110 can perform these functions using only two sub-arrays 110a and 110b rather than prior art arrays that typically require four sub-arrays—effectively halving the total footprint and manufacturing cost of the phased array.

Alternatively or additionally, illustrative embodiments of the phased array can reduce, if not prevent, interference during signal transmission or signal reception between differently polarized signals. Such interference is typically exhibited in conventional phased arrays that use individual dual mode, dual polarization integrated circuits in combination with a switch to transmit (or receive) horizontal polarized signals and vertically polarized signals through the array at the same time.

As described in more detail below, by transmitting (or receiving) differently polarized signals using separate sub-arrays, each sub-array transmitting (or receiving) in one polarization at any given time, such interference can be avoided. Additionally, because illustrative embodiments of the phased array can be less dense than conventional phased arrays (e.g., approximately half the number of circuits), such illustrative embodiments can generate less heat per unit area and can simplify board routing between circuit components.

In illustrated embodiments, each sub-array 110a and 110b has four elements 18 that are connected to, and thus share, a single dual transmit/receive beam forming integrated circuit 14D (sometimes referred to herein as a "dual mode integrated circuit"). Beam forming lines 26r and 26t connect the integrated circuit 14D with the four elements 18. The elements 18 preferably are sized and oriented so that, from side-to-side, they are about half the size of one anticipated wavelength of the signals being transmitted and received. In some embodiments, the length and width of the respective elements 18 can be different if the anticipated wavelengths of the transmit and receive signals are also different.

Adjacent sides of the element or patch (e.g., edges 18h and 18v), however, can be physically about 90 degrees out of phase with each other. In this manner, the beam forming lines (e.g., receive lines 26r in the sub-array 110a) for operating with signals in a first polarization (e.g., a horizontal polarity) may be coupled to one side (e.g., an edge 18h), while the lines (e.g., transmit lines 26t in the sub-array 110a) for operating with signals in a second, orthogonal polarization (e.g. a vertical polarity) may be coupled with a second, adjacent side (e.g., an edge 18v), or other side that is 90 degrees out of phase with the first side 18h.

To those ends, the dual mode integrated circuit 14D of the first sub-array 110a has four receive interfaces and four transmit interfaces (collectively interfaces 14i). Each beam forming line 26r from the receive interfaces is connected directly to a physical side edge 18h (from the perspective of the drawings) of a corresponding element 18. Each of the beam forming lines 26t from the transmit interfaces is connected directly to a physical top or bottom edge 18v (from the perspective of the drawings) of a corresponding element 18. These physical connections to the element 18 ensure proper polarity; i.e., in this example, the side edge 18h of the element 18 receives horizontally polarized signals, while the top or bottom edge 18v of the element 18 transmits vertically polarized signals. Those skilled in the art can modify the element 18, however, for different polarizations.

The second sub-array 110b also has four elements 18 connected to a single dual transmit/receive beam forming integrated circuit 14D. Unlike the first sub-array 110a, the transmit beam forming lines 26t of the second sub-array connect with one of the horizontally polarized side edges 18h of the elements 18, while the receive beam forming lines 26r connect with an adjacent top or bottom side 18v of the elements 18 that is vertically polarized. In some embodiments, the same model and/or type of transmit/receive beam forming integrated circuit 14D as that used in the first sub-array 110a may be used, but rotated 90 degrees (i.e., highlighted by the text in the figure rotated 90 degrees from its corresponding orientation of the second sub-array 110b) to provide the desired line connections after rotation with the same interfaces/pins 14i of the integrated circuit 14D.

It should be noted that discussion of the shape and orientation of the elements 18 is merely exemplary. Those skilled in the art can configure the elements 18 to be orthogonally oriented (e.g., 90 degrees out of phase) using other techniques in the art. Accordingly, discussion of this specific manner of forming out of phase elements 18 is for illustrative purposes only. Moreover, these two cross-polarized sub-arrays 110a and 110b can include more than one dual mode beam forming integrated circuit 14D and more than four elements 18. As described in more detail below with respect to FIGS. 7A-7C, each of the sub-arrays 110a and 110b can have dozens or hundreds of sets of integrated circuits 14D and corresponding elements 18.

Figure 6A:
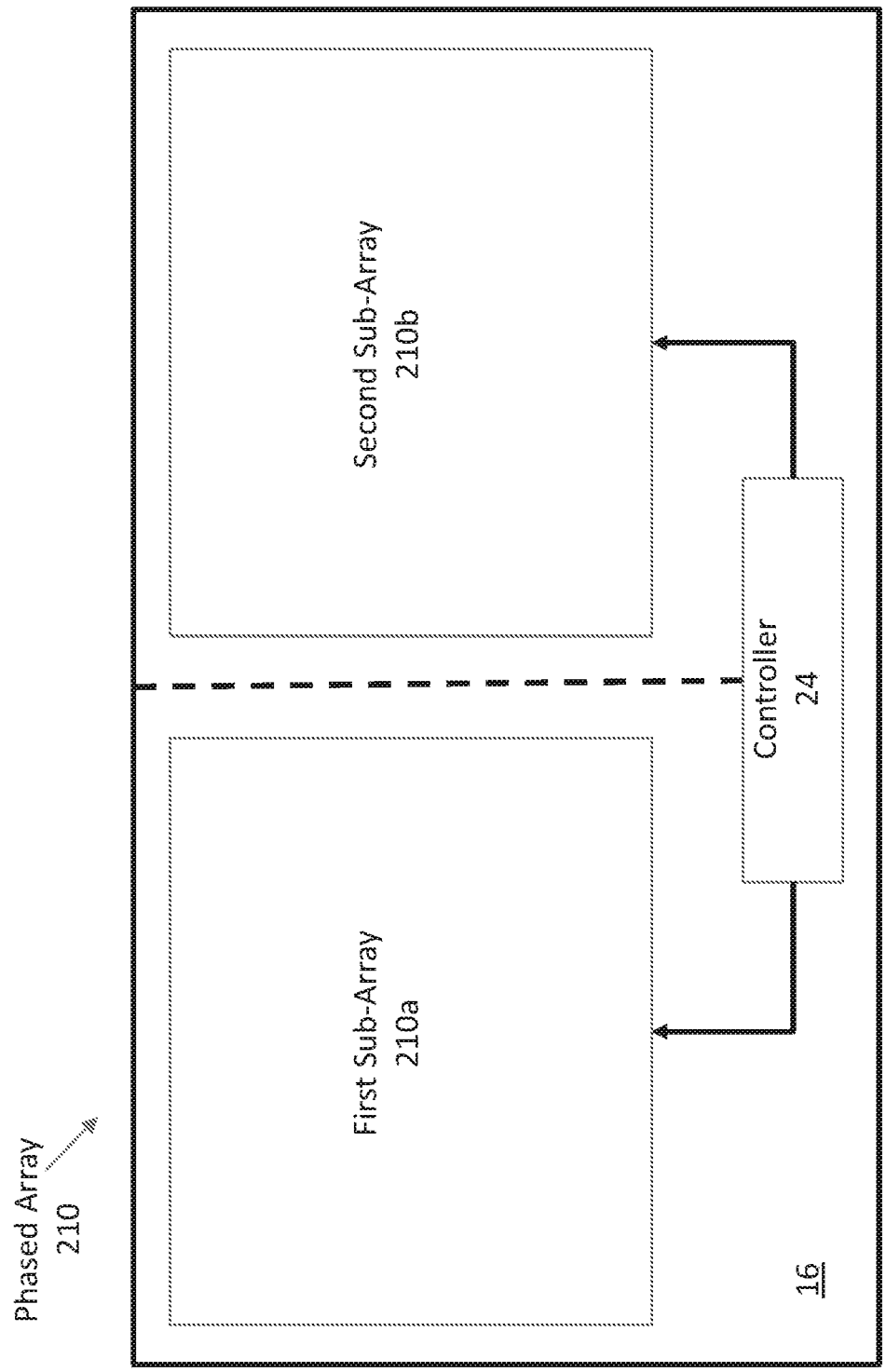
FIGS. 6A, 6B, and 6C schematically show another exemplary embodiment of a phased array antenna of an AESA system including cross-polarized sub-arrays configured in accordance with other embodiments of the invention.
Figure 6B:
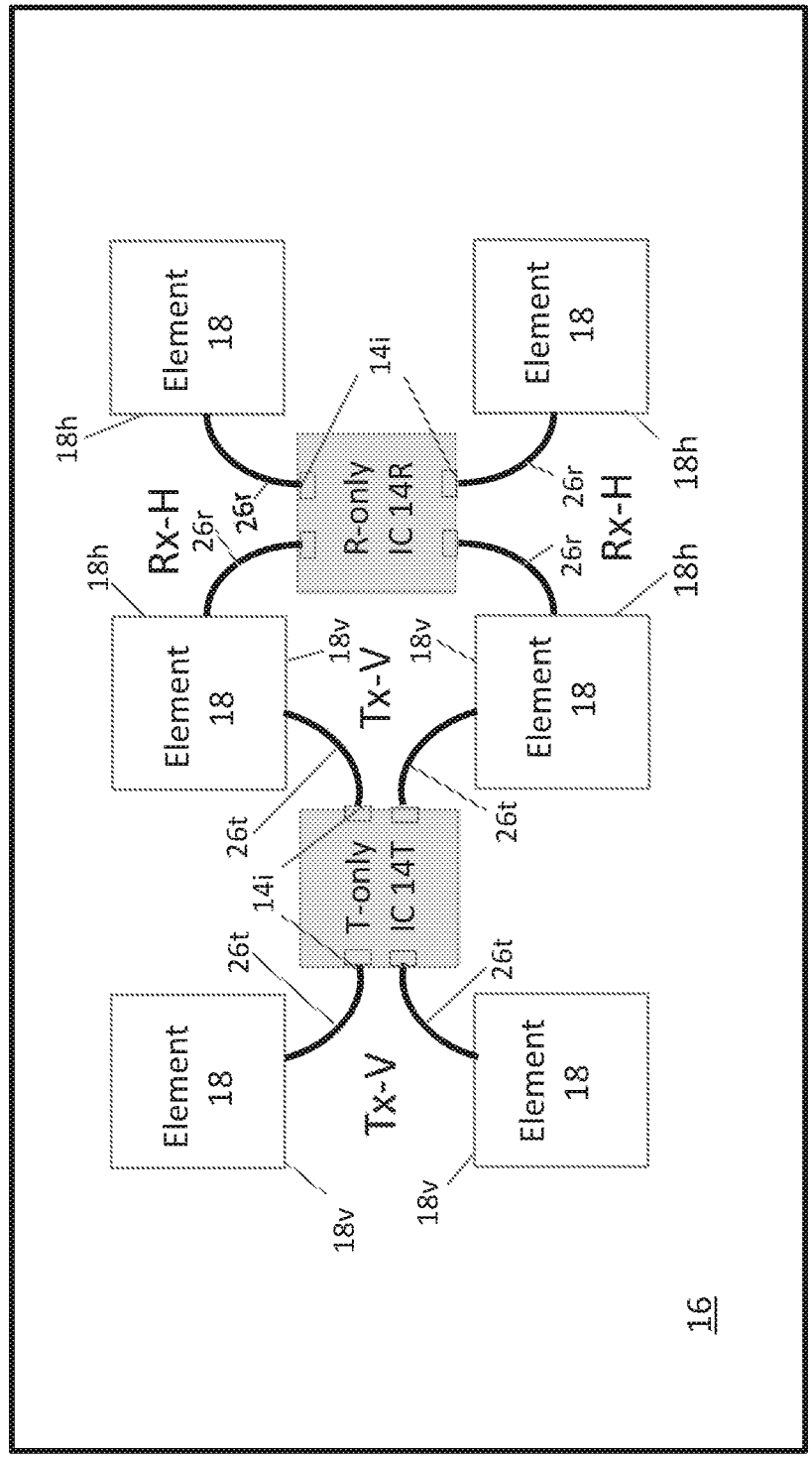
Figure 6C:
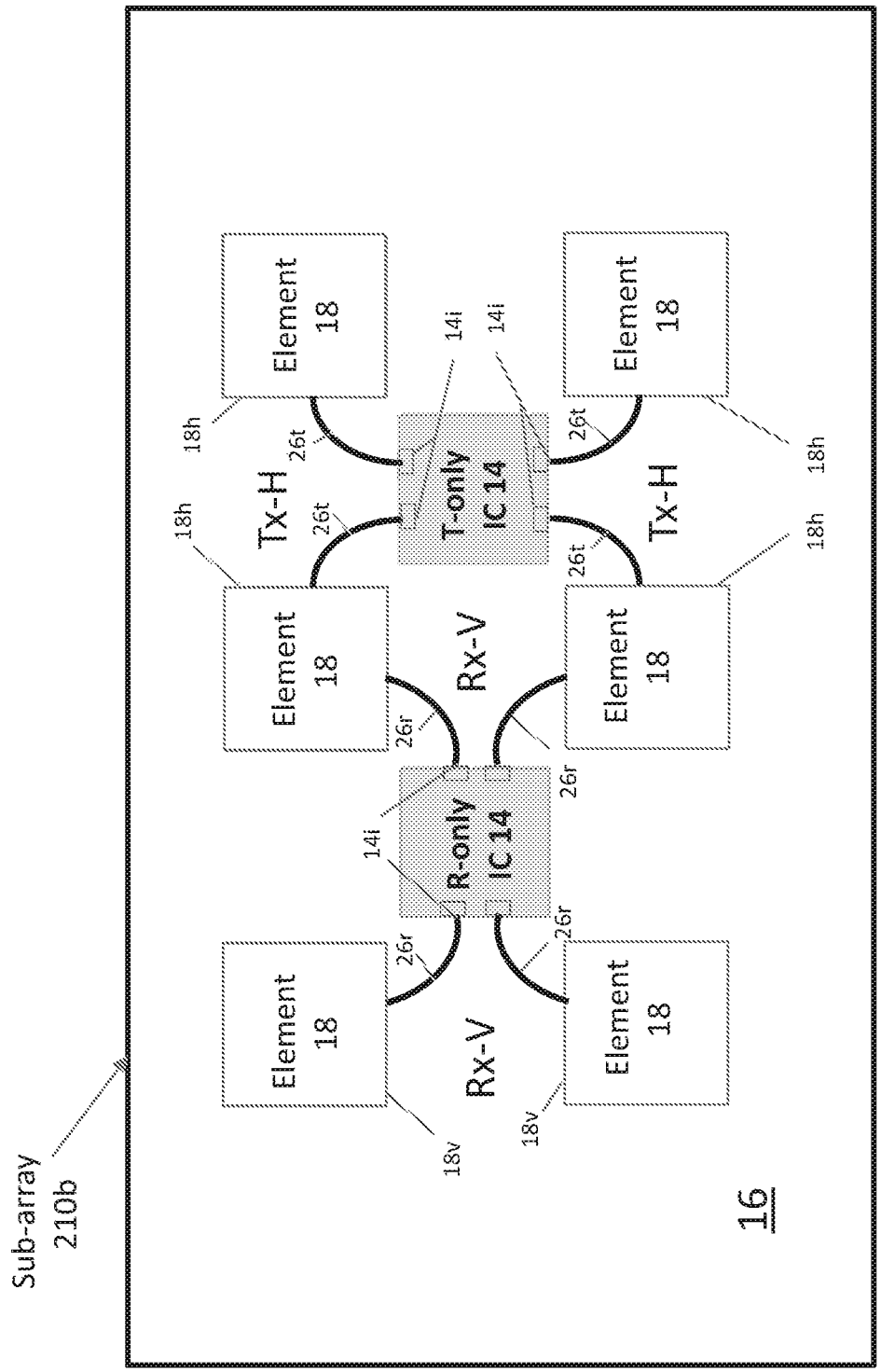

Indeed, rather than using dual transmit/receive integrated circuits 14D, illustrative embodiments may use transmit-only and receive-only integrated circuits. For example, FIGS. 6A, 6B, and 6C schematically show a plan view of one exemplary embodiment of a laminar phased array 210 configured in accordance with illustrative embodiments of the invention. In illustrative embodiment, the phased array 210 includes two cross-polarized sub-arrays 210a and 210b that can perform similar to the phased array 110 of FIG. 5, but with different integrated circuits and element arrangements. For example, as shown in FIGS. 6B and 6C, each of the sub-arrays 210a and 210b includes a transmit-only integrated circuit 14T, a receive-only integrated circuit 14R, and six (6) elements 18. The integrated circuits 14T and 14R in each sub-array are coupled to four elements 18. Accordingly, the first sub-array 210a of FIG. 6B can receive horizontally polarized signals and transmit vertically polarized signals, while the second sub-array 210b of FIG. 6C can receive vertically polarized signals and transmit horizontally polarized signals.

As with the embodiment of FIG. 5, a controller 24 or other logic can coordinate operation of the two sub-arrays 210a and 210b so that in the receive mode, the overall phased array 210 receives both horizontally polarized and vertically polarized signals. For example, in illustrative embodiments, the first sub-array 210a receives horizontally polarized signals, while the second sub-array 210b receives vertically polarized signals. When in the receive mode, the sub-arrays 210a and 210b can be prevented from transmitting signals.

In a corresponding manner, when in the transmit mode, the overall phased array 210 transmits both horizontally polarized and vertically polarized signals. For example, in illustrative embodiments, the first sub-array 210a transmits vertically polarized signals, while the second sub-array 210b transmits horizontally polarized signals. When in the transmit mode, the sub-arrays 210a and 210b can be prevented from receiving signals (i.e., the sub-arrays do not process any signals that may be incident on their receiving faces).

As shown with more detail in FIG. 6B, the first sub-array 210a can include six elements 18 that each connect with at least one of a transmit-only integrated circuit 14T and a receive-only integrated circuit 14R. For example, as shown, the two center elements 18 are both connected to the transmit-only integrated circuit 14T and a receive-only integrated circuit 14R, the rightmost elements 18 (from the perspective of the drawing) are connected to the receive-only integrated circuit 14R, and the leftmost elements 18 are connected to transmit-only integrated circuits 14T. Although not shown, the rightmost elements 18 can also be connected to another transmit-only integrated circuit 14T, and the two leftmost elements 18 can be connected to another receive-only integrated circuit 14R. In a manner similar to FIG. 5, the transmit beam forming lines 26t and the receive beam forming lines 26r can be connected to a corresponding element 18 ninety degrees)(90°) out of phase. For example, in the first sub-array 210a, the receive lines 26r connect the receive interfaces/pins 14i of a receive-only integrated circuits 14R with horizontally polarized side edges 18h of the elements 18 to receive incoming signals in a horizontal polarity, while the transmit lines 26t connect the transmit interfaces/pins 14i of the transmit-only integrated circuit 14R with vertically polarized top or bottom sides 18v of the elements 18 to transmit outgoing signals in a vertical polarity.

Referring to FIG. 6C, the second sub-array 210b can be configured in a complementary manner. For example, the transmit lines 26t can connect the transmit interfaces/pins 14i of the transmit-only integrated circuits 14T to the horizontally polarized side edges 18h of the elements 18 to transmit outgoing signals in a horizontal polarity, while the receive lines 26r can connect the receive interfaces/pins 14i of the receive-only integrated circuits 14T to the vertically polarized top or bottom edges 18v of the elements 18 to receive incoming signals in a vertical polarity.

Accordingly, during operation, the controller 24 or other logic can be configured to actuate either the transmit-only integrated circuits 14T or the receive-only integrated circuits 14R of the respective sub-arrays 210a and 210b as required for a given mode. For example, in the receive mode, only the receive-only integrated circuits 14R in the sub-arrays 210a and 210b are actuated while the transmit-only integrated circuits 14T are not actuated. Thus, the phased array 210 can receive both vertically and horizontally polarized signals using only two sub-arrays 210a and 210b.

In a corresponding manner, when in the transmit mode, only the transmit-only integrated circuits 14T in the respective sub-arrays 210a and 210b are actuated while the receive-only integrated circuits 14R are not actuated. Thus, the phased array 210 also can transmit both vertically and horizontally polarized signals using only two sub-arrays 210a and 210b. Moreover, both of the sub-arrays 210a and 210b can be free of transmit/receive switches, which switch between a transmit mode and a receive mode. Favorably, feeding the elements 18 in the described manner enables transmit-to-receive isolation.

Figure 7B:
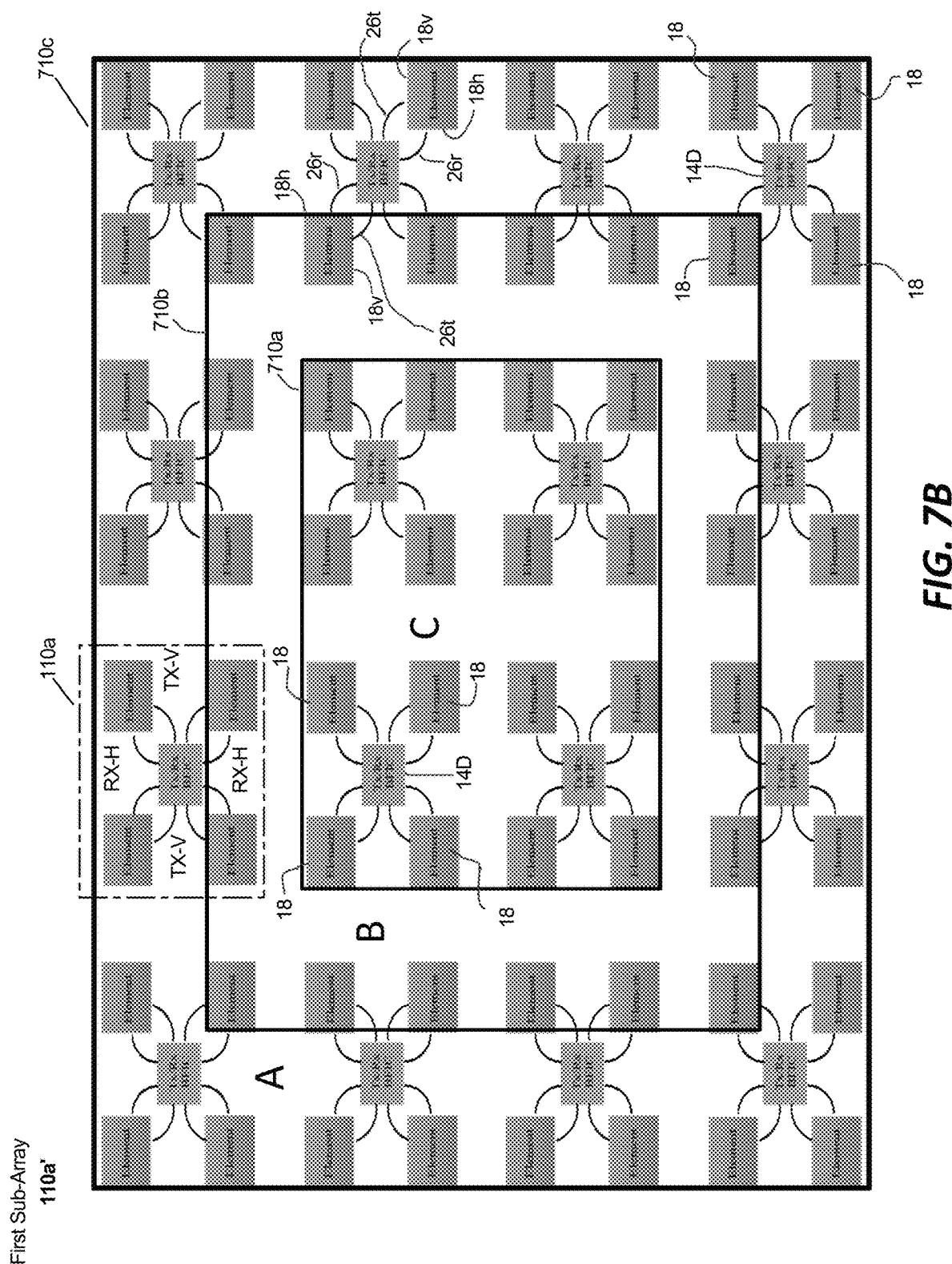
Figure 7C:
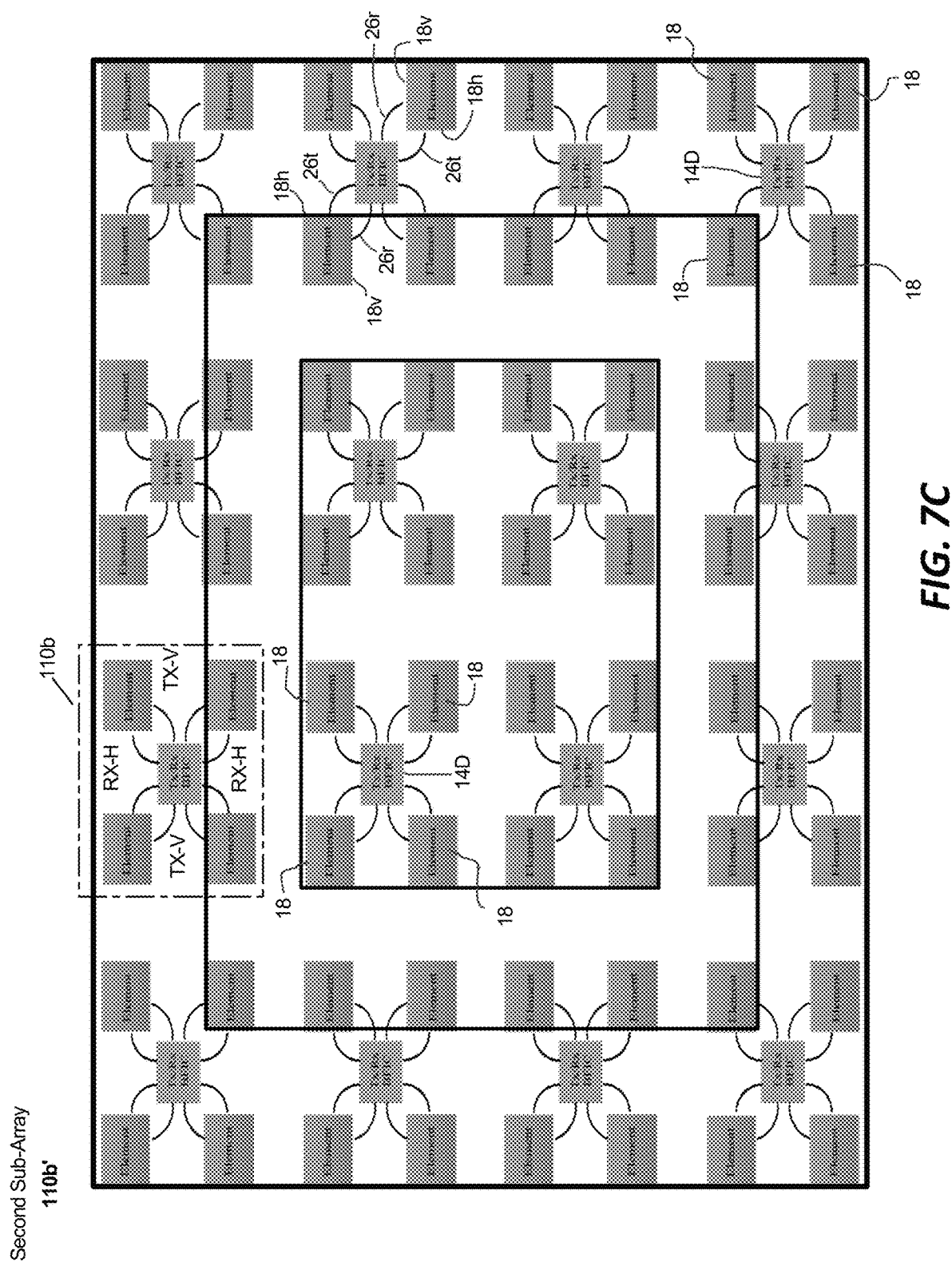

As indicated above with respect to FIG. 5, each of the cross-polarity sub-arrays 110a and 110b of the phased array 110 can, in some embodiments, include more than one dual mode integrated circuit 14D and more than four elements 18. For example, FIGS. 7A, 7B, and 7C schematically show a plan view of one exemplary embodiment of a laminar phased array 110' that includes cross-polarized sub-arrays 110a' and 110b' configured in accordance with illustrative embodiments of the invention. Specifically, FIG. 7B shows one exemplary embodiment of the first sub-array 110a' that includes multiple dual transmit/receive integrated circuits 14D and more than four elements 18. Likewise, FIG. 7C shows one exemplary embodiment of a second sub-array 110b' that includes multiple dual transmit/receive integrated circuits 14D and more than four elements 18. The first and second sub-arrays 110a' and 110b' can be respectively operated in one of a receive mode or a transmit mode by a controller 24 or other logic.

Referring to FIG. 7B, the first sub-array 110a' includes sixteen (16) groups of elements 18 and dual mode integrated circuits 14D disposed on a single substrate 16 (e.g., a printed circuit board). Although 16 groups are shown, persons skilled in the art will recognize that the first sub-array 110a' can have more or less than 16 groups. Like the first sub-array 110a of FIG. 5, each group may include four elements 18 connected to one dual transmit/receive integrated circuit 14D, such that incoming signals can be received in a first polarity (e.g., a horizontal polarity) and outgoing signals can be transmitted in a second polarity (e.g., a vertical polarity).

Referring to FIG. 7C, the second sub-array 110b' can also include sixteen (16) groups of elements 18 and dual mode integrated circuits 14D disposed on a substrate 16. Although 16 groups are shown, persons skilled in the art will recognize that the second sub-array 110b' can include more or less than 16 groups. Like the first sub-array 110a' of FIG. 7B, each group includes four elements 18 connected to one dual transmit/receive integrated circuit 14D. However, as shown, each of the dual mode integrated circuits 14D of the sub-array 110b' are connected differently to four corresponding elements 18, such that incoming signals can be received in the second polarity (e.g., the vertical polarity) and outgoing signals can be transmitted in the first polarity (e.g., the horizontal polarity). Thus, the second sub-array 110b' is configured to operate with receive and transmit polarities that are opposite to the respectively receive and transmit polarities of the first sub-array 110a'.

A controller 24 or other logic can coordinate operation of the two sub-arrays 110a' and 110b' so that in the receive mode, the overall phased array 110' can receive both horizontally polarized and vertically polarized signals. In illustrative embodiments, the first sub-array 110a' receives horizontally polarized signals, while the second sub-array 110b' receives vertically polarized signals. When in the receive mode, the cross-polarized sub-arrays 110a' and 110b' can be prevented from transmitting signals.

In a corresponding manner, when in the transmit mode, the overall array 110' can transmit both horizontally polarized and vertically polarized signals. For example, in illustrative embodiments, the first sub-array 110a' transmits vertically polarized signals, while the second sub-array 110b' transmits horizontally polarized signals. When in the transmit mode, the sub-arrays 110a' and 110b' can be prevented from receiving signals (i.e., the sub-arrays do not process any signals that may be incident on their receiving faces).

In some embodiments, the cross-polarized sub-arrays 110a' and 110b' may be disposed on the same or different substrates 16. Some embodiments of the phased array 110' may have more than one type of sub-array, such as multiple sub-arrays using one polarization as discussed above (e.g., receive/horizontal and transmit/vertical), and the other using opposite polarizations (e.g., receive/vertical and transmit/horizontal).

In some embodiments, the elements 18 in each sub-array can be aggregated into logical sets or regions to perform different functions. For example, FIG. 7B schematically shows three logical rectangles 710a, 710b, and 710c corresponding to various sets of elements 18 included in the sub-array 110a'. The logical rectangle 710c represents the outer edge of the sub-array 110a'. The elements 18 in the area between the outer rectangle 710c and the middle rectangle 710c ("first region A") may be used for a first function, while the elements 18 in the area between the inner rectangle 710a and the middle rectangle 710b ("second region B") may be used for a second function. The area within the inner rectangle 710a ("third region C") may be used for yet a third function. The elements 18 of the sub-array 110b' can be aggregated into similar or different sets.

A controller 24 or other logic may be configured to control the elements 18 within each of those regions to perform a receive and/or transmit function, depending on the application. For example, the elements 18 in the first region A may be used for signal reception while the second and third regions B and C may be used for signal transmission. As another example, the elements 18 of the first and second regions A and B may be used for receiving while the elements 18 of the third region C may be used for transmitting. Other examples may use the elements 18 in all of the regions A, B, and C for transmitting and receiving. In some embodiments, the respective transmit or receive functions performed by the elements 18 in each region may be associated with specific beam forming attributes (e.g., amplitude, phase, and/or frequency).

In some embodiments, the elements 18 can be aggregated to form receive or transmit apertures having different sizes. For example, a controller 24 or other logic can be configured to actuate all of the elements 18 within rectangle 710c to form 8×8 transmit or receive aperture. Alternatively or additionally, in some embodiments, the controller 24 can be configured to actuate some of the elements 18 to form a 6×6 aperture (i.e., within the logical rectangle 710b) or a 4×4 aperture (i.e., within the logical rectangle 710a). Persons skilled in the art will recognize that transmit or receive apertures of other dimensions are also possible.

Figure 8A:
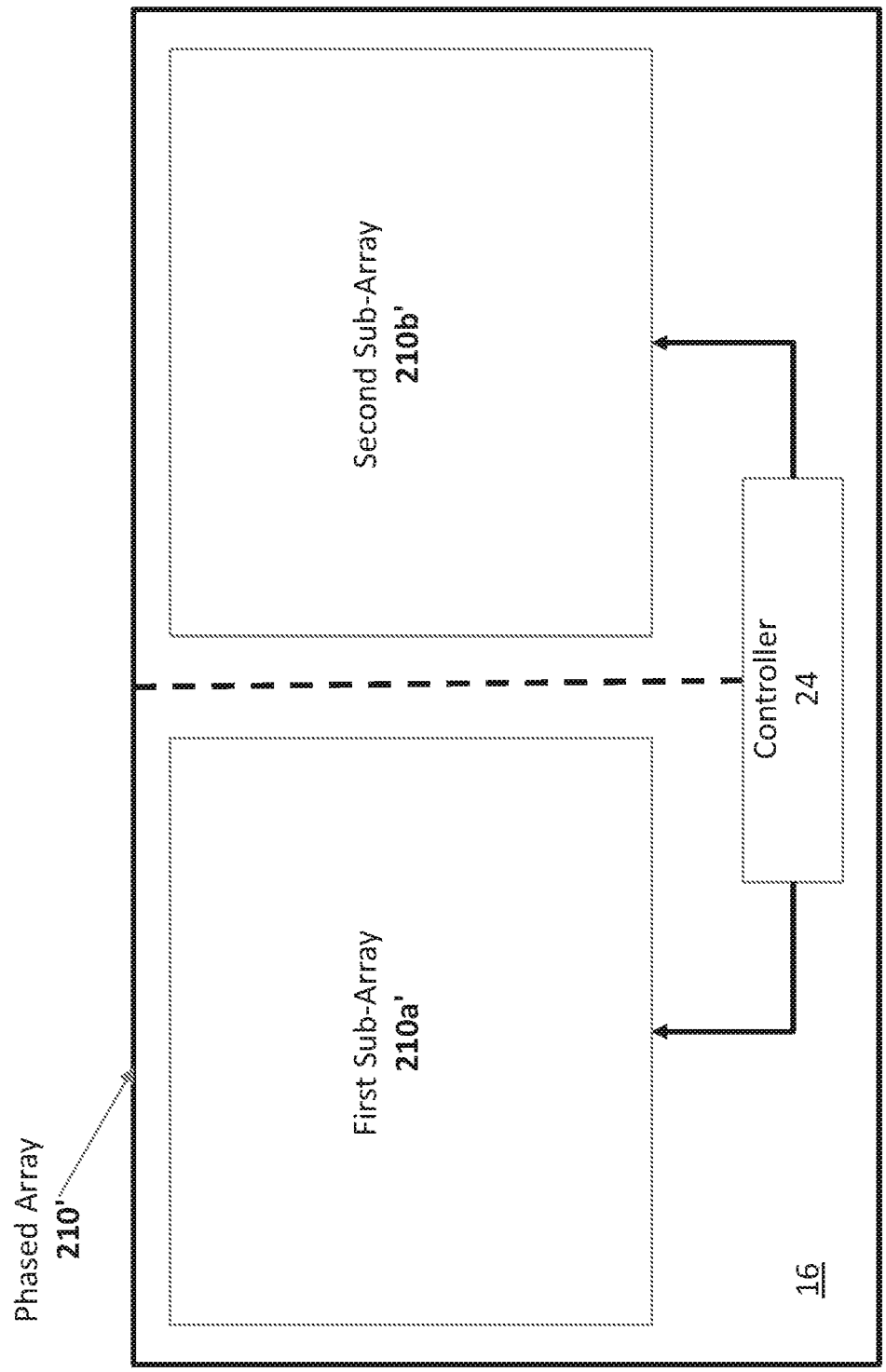
FIGS. 8A, 8B, and 8C schematically show one exemplary embodiment of a phased array antenna including cross-polarized sub-arrays having multiple transmit-only and receive-only beam forming integrated circuits to control antenna elements in accordance with illustrative embodiments of the invention.
Figure 8B:
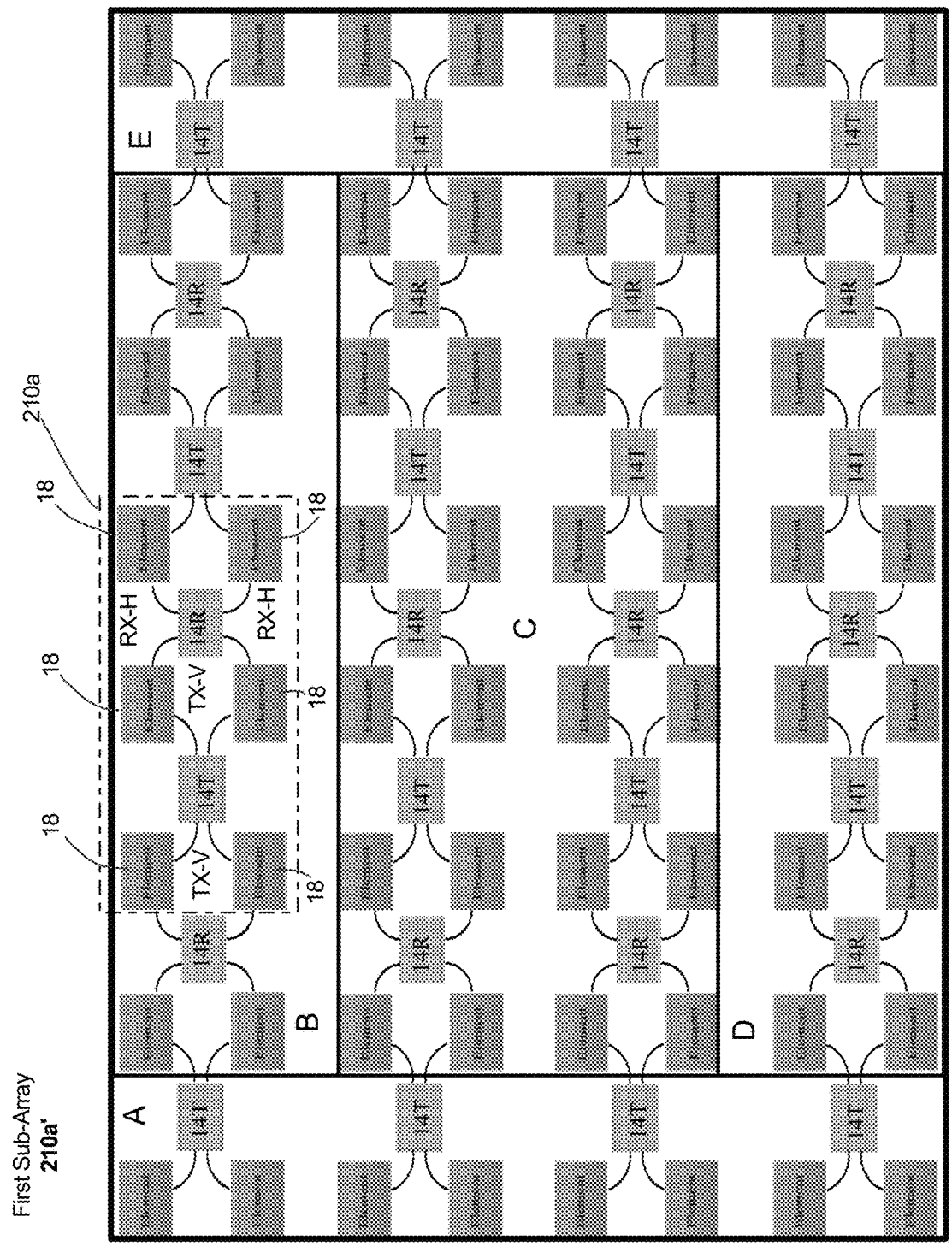
Figure 8C:
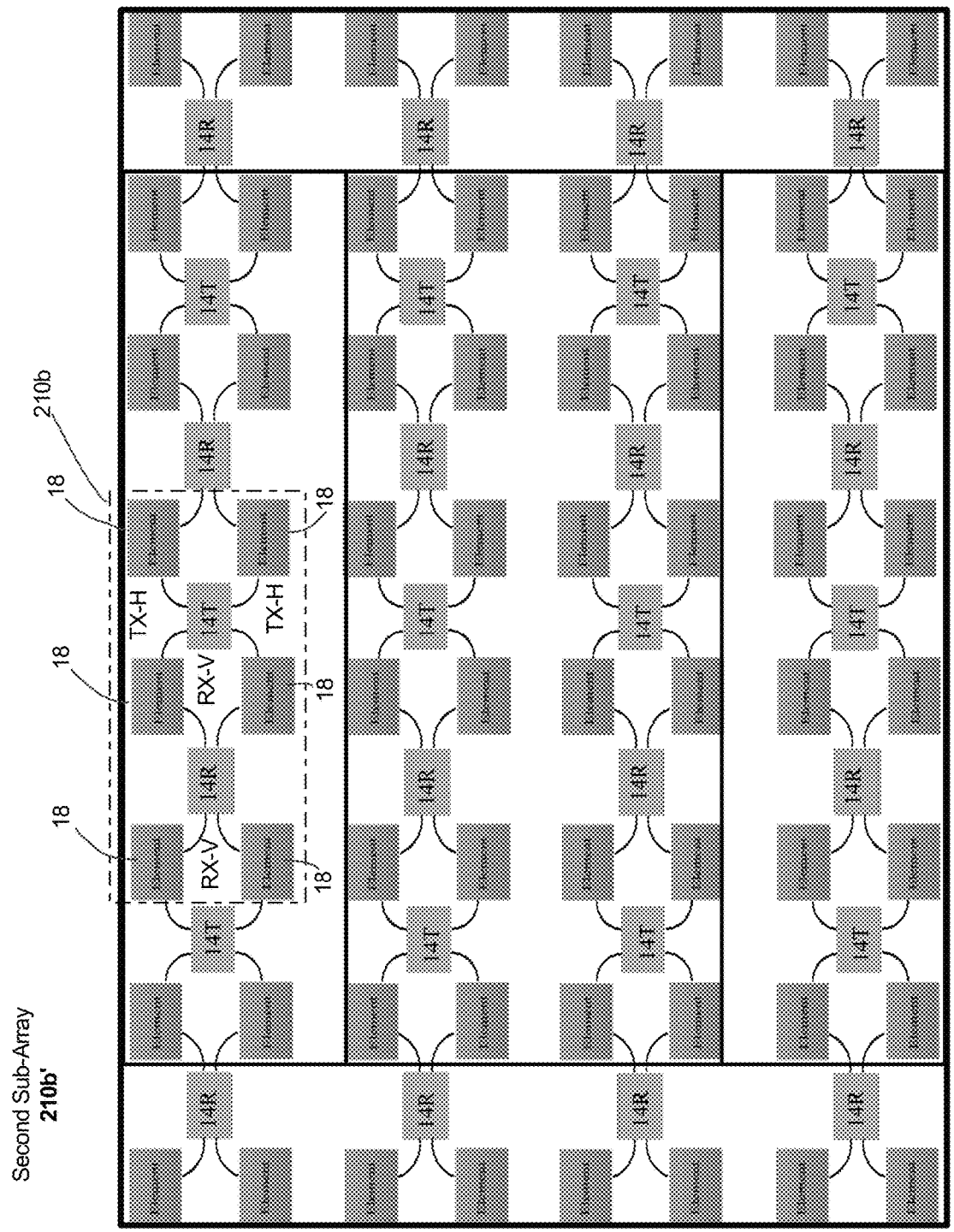

As indicated above with respect to FIGS. 6A-6C, each of the cross-polarized sub-arrays 210a and 210b of the phased array 210 can include one receive-only integrated circuit 14R, one transmit-only integrated circuit 14T, and six elements 18. However, as shown in FIGS. 8A, 8B, and 8C, in some embodiments, the phased array 210' can include cross-polarized sub-arrays 210a' and 210b', each sub-array having multiple receive-only integrated circuits 14R, multiple transmit-only integrated circuits 14T, and more than six elements 18. The first and second sub-arrays 210a' and 210b' can be respectively operated in one of a receive mode or a transmit mode by a controller 24 or other logic.

For example, FIG. 8B schematically shows one exemplary embodiment of a first sub-array 210a' that includes sixteen (16) transmit-only integrated circuits 14T, twelve (12) receive-only integrated circuits 14R, and sixty-four (64) elements 18. Like the first sub-array 210a of FIG. 6B, each of the transmit-only integrated circuits 14T of the sub-array 210a' can be connected to four corresponding elements 18 such that outgoing signals can be transmit in a vertical polarity. Conversely, each of the receive-only integrated circuits 14R can be connected to four corresponding elements 18 such that incoming signals can be received in a horizontal polarity. As shown in FIG. 8B, some of the antenna elements 18 are coupled to both transmit-only and receive-only integrated circuits 14T and 14R, while some of the antenna elements 18 are solely coupled to transmit-only integrated circuits 14T.

FIG. 8C schematically shows one exemplary embodiment of a second sub-array 210b' that includes twelve (12) transmit-only integrated circuits 14T, sixteen (16) receive-only integrated circuits 14R, and sixty-four (64) elements 18. Like the second sub-array 210b of FIG. 6C, each of the transmit-only integrated circuits 14T of the sub-array 210b' can be connected to four corresponding elements 18 such that outgoing signals can be transmitted in a horizontal polarity. Conversely, each of the receive-only integrated circuits 14R can be connected to four corresponding elements 18 such that incoming signals can be received in a vertical polarity. Thus, the transmit and receive polarities of the second sub-array 210b' are opposite to the respective transmit and receive polarities of the first sub-array 210a'. As shown in FIG. 8C, some of the antenna elements 18 are coupled to both transmit-only and receive-only integrated circuits 14T and 14R, while some of the antenna elements 18 are solely coupled to receive-only integrated circuits 14R.

A controller 24 or other logic can coordinate operation of the two sub-arrays 210a' and 210b' so that in the receive mode, the overall array 210' receives both horizontally polarized and vertically polarized signals. Specifically, the first sub-array 210a' receives horizontally polarized signals, while the second sub-array 210b' receives vertically polarized signals. When in the receive mode, the sub-arrays 210a' and 210b' can be prevented from transmitting signals.

In a corresponding manner, when in the transmit mode, the overall array 210' transmits both horizontally polarized and vertically polarized signals. Specifically, the first sub-array 210a' transmits vertically polarized signals, while the second sub-array 210b' transmits horizontally polarized signals. When in the transmit mode, the sub-arrays 210a' and 210b' can be prevented from receiving signals (i.e., the sub-arrays do not process any signals that may be incident on their receiving faces).

Like the cross-polarized sub-arrays 110a' and 110b' shown in FIGS. 7A and 7B, the sub-array 210a' and 210b' can be divided into multiple regions, each region including one or more elements 18 that can be configured to perform certain transmit and/or receive functions specified for that region. One skilled in the art can configure those regions as appropriate for the given application. Referring to FIG. 8B, the sub-array 210a' can be divided into five (5) regions A, B, C, D, and E. Although FIG. 8B shows five regions, one skilled in the art will recognize that the elements 18 of the sub-array 210a' can be aggregated into more or less than five regions. In some embodiments, the elements 18 of the phased array 210' can be aggregated into regions such that the receive aperture of the antenna is larger size than its transmit aperture 210a'. For example, the controller 24 can be actuate the elements 18 such that more elements are configured for signal reception than signal transmission.

Alternative embodiments may combine any of the cross-polarity sub-arrays disclosed herein to form a resultant phased array antenna to transmit (or receive) signals in dual polarities at the same time. For example, the first sub-array 110a' of FIG. 7B may be paired with the second sub-array 210b' of FIG. 8C. In this case, since the second sub-array 210b' of FIG. 8C transmits horizontally polarized signals and receives vertically polarized signals, the paired sub-array 110a' of FIG. 7B preferably can be configured to transmit vertically polarized signals and receive horizontally polarized signals. Accordingly, complimentary sub-arrays similar to those discussed above in FIGS. 5, 6B, 6C, 7B, 7C, 8B and 8C can be combined into a single phased array antenna.

In some embodiments, the illustrative embodiments can avoid the need for a transmit/receive switch typically required in conventional time division multiplexed (TDD) 5G active antennas. In addition, illustrative embodiments can cross-polarize dual transmit/receive active antenna apertures to achieve high performance of transmit-only and receive-only arrays with dual linear polarization.

Conventional phase array antennas known by the inventors require twice as many sub-arrays and thus, required twice as many elements 18 (aka "apertures"). As such, the illustrative embodiments of the phased arrays disclosed herein (e.g., 110, 110', 210, and 210') can reduce the number of elements and thus the footprint of the array by approximately fifty percent (resulting in significant manufacturing cost savings).

Some conventional phased arrays use individual dual mode, dual polarization integrated circuits in combination with a switch to simultaneously transmit (or receive) horizontal polarized signals and vertically polarized signals through the array. Thus, such conventional arrays typically exhibit interference during signal transmission or reception such that the signal from one polarization can leak into the other polarization, thereby corrupting the quality of signal. Standards for 5G require very low level of corruption.

As described above, to avoid such interference, illustrative embodiments can transmit (or receive) differently polarized signals at the same time using separate sub-arrays, such that each sub-array transmits (or receives) in one polarization at any given time. Additionally, because illustrative embodiments of the phased array can be less dense than conventional phased arrays (e.g., approximately half the number of circuits), such illustrative embodiments can generate less heat per unit area and can simplify board routing between circuit components.

Illustrative embodiments permit the integrated circuits 18 to use about half the DC power compared to current state of the art integrated circuits that have two transmit poles (or two receive poles) active at the same time. This is so because the illustrative integrated circuit does not have dual pole transmit or dual pole receive on at any time. Each integrated circuit preferably is always single pole at any instance in time. Accordingly, even though the integrated circuits may always be active in various embodiments, they are either in a transmit mode or a receive mode with opposite polarizations in opposite arrays. Since no integrated circuit needs to have both polarizations at any single time, the power requirements may be approximately halved.

As noted, various embodiments can be used with a wide variety of different applications. For example, it is anticipated that such embodiments can be used with many time division duplexed (TDD) active antenna systems, 5G base stations, customer premises equipment, and user equipment terminals.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A laminar phased array antenna system comprising:
a first sub-array configured to operate in a receive mode with a first polarity and a transmit mode with a second polarity, the first polarity being physically orthogonal to the second polarity;
a second sub-array configured to operate in a receive mode with the second polarity and a transmit mode with the first polarity; and
a controller configured to control the first sub-array and the second sub-array to operate together in either a receive mode or in a transmit mode, wherein each of the first sub-array and the second sub-array includes a plurality of elements configured to form a patch-based phased array and a dual mode integrated circuit configured to control receipt and transmission of signals by the plurality of elements, each of the elements having a first polarity interface at a first location and a second polarity interface at a second location spaced apart from the first location, each dual mode integrated circuit having a plurality of transmit interfaces and a plurality of receive interfaces, the dual mode integrated circuit of the first sub-array having its receive interfaces coupled respectively to the first polarity interfaces of the first sub-array elements and having its transmit interfaces coupled respectively to the second polarity interfaces of the first sub-array elements, the dual mode integrated circuit of the second sub-array having its receive interfaces coupled respectively to the second polarity interfaces of the second sub-array elements and having its transmit interfaces coupled respectively to the first polarity interfaces of the second sub-array elements.

2. The laminar phased array antenna system of claim 1, wherein:
the first sub-array and the second sub-array being configured to operate at the same time to receive signals in the first polarity and the second polarity when in the receive mode, and
the first sub-array and the second sub-array being configured to operate at the same time to transmit signals in the first polarity and the second polarity when in the transmit mode.

3. The laminar phased array antenna system of claim 1, wherein the dual mode integrated circuits are configured to operate the phased array to communicate signals using 5G protocols.

4. The laminar phased array antenna system of claim 1, wherein the first polarity includes a vertical polarity and the second polarity includes a horizontal polarity.

5. The laminar phased array antenna system of claim 1, wherein the first polarity includes a horizontal polarity and the second polarity includes a vertical polarity.

6. The laminar phased array antenna system of claim 1, wherein each of the first sub-array and the second sub-array is transmit/receive switch-free.

7. The laminar phased array antenna system of claim 1, wherein the first sub-array includes a first laminar substrate, and the second sub-array includes a second laminar substrate, the first laminar substrate and the second laminar substrate being different substrates.

8. The laminar phased array antenna system of claim 1, wherein the first sub-array and the second sub-array are configured on a single laminar substrate.

9. A beam forming integrated circuit for use in a laminar phased array antenna system having a first sub-array configured to operate in a receive mode with a first polarity and a transmit mode with a second polarity physically orthogonal to the first polarity and a second sub-array configured to operate in a receive mode with the second polarity and a transmit mode with the first polarity, each of the first sub-array and the second sub-array including a plurality of elements configured to form a patch-based phased array and a dual mode integrated circuit configured to control receipt and transmission of signals by the plurality of elements, each of the elements having a first polarity interface at a first location and a second polarity interface at a second location spaced apart from the first location, the beam forming integrated circuit comprising:

a plurality of transmit interfaces and a plurality of receive interfaces which, when the beam forming integrated circuit is disposed in the first sub-array, has its receive interfaces coupled respectively to the first polarity interfaces of the first sub-array elements and has its transmit interfaces coupled respectively to the second polarity interfaces of the first sub-array elements, and when the beam forming integrated circuit is disposed in the second sub-array, has its receive interfaces coupled respectively to the second polarity interfaces of the second sub-array elements and has its transmit interfaces coupled respectively to the first polarity interfaces of the second sub-array elements.

10. The integrated circuit of claim 9, wherein the first sub-array and the second sub-array are configured to operate together in the receive mode such that the first sub-array and the second sub-array receive incoming signals in the first polarity and incoming signals in the second polarity at the same time.

11. The integrated circuit of claim 9, wherein the first sub-array and the second sub-array are configured to operate together in the transmit mode such that the first sub-array and the second sub-array transmit outgoing signals in the first polarity and output signals in the second polarity at the same time.

12. The beam forming integrated circuit of claim 9, configured to operate the phased array to communicate signals using 5G protocols.

13. The beam forming integrated circuit of claim 9, wherein the first polarity includes a vertical polarity and the second polarity includes a horizontal polarity.

14. The beam forming integrated circuit of claim 9, wherein the first polarity includes a horizontal polarity and the second polarity includes a vertical polarity.

* * * * *